US008177967B2

(12) United States Patent
Bagci et al.

(10) Patent No.: US 8,177,967 B2
(45) Date of Patent: May 15, 2012

(54) SPIN-ON FILTER WITH PERFORMANCE ENHANCEMENT FEATURES

(75) Inventors: Ismail C. Bagci, Cookeville, TN (US); Kevin C. South, Cookeville, TN (US); Gregory W. Hoverson, Cookeville, TN (US); Byron Andrew Pardue, Cookeville, TN (US); Peter K. Herman, Cookeville, TN (US); Chris A. Schoonover, Lima, OH (US); Patrick J. Galecki, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1692 days.

(21) Appl. No.: 10/778,523

(22) Filed: Feb. 16, 2004

(65) Prior Publication Data
US 2005/0178706 A1    Aug. 18, 2005

(51) Int. Cl.
  *B01D 27/08*    (2006.01)
  *B01D 27/10*    (2006.01)
(52) U.S. Cl. ......... 210/133; 210/136; 210/232; 210/444
(58) Field of Classification Search .................. 210/130, 210/440, 133, 136, 444, 232
  See application file for complete search history.

(56) References Cited

U.S. PATENT DOCUMENTS

| | | | | |
|---|---|---|---|---|
| 3,473,666 A * | 10/1969 | Humbert, Jr. | ................. | 210/232 |
| 3,785,491 A * | 1/1974 | Dudinec et al. | ................ | 210/130 |
| 4,933,093 A | 6/1990 | Keller | ........................... | 210/774 |
| 5,104,537 A | 4/1992 | Stifelman et al. | ............. | 210/440 |
| 5,258,118 A | 11/1993 | Gouritin et al. | ............... | 210/206 |
| 5,342,519 A | 8/1994 | Friedmann et al. | ........... | 210/232 |
| 5,405,527 A * | 4/1995 | Covington | ..................... | 210/130 |
| 5,453,195 A * | 9/1995 | Jorgenson et al. | ............ | 210/444 |
| 5,462,658 A | 10/1995 | Sem | .............................. | 210/172 |
| 5,772,881 A * | 6/1998 | Stockhowe et al. | ........... | 210/440 |
| 5,868,932 A | 2/1999 | Guichaoua et al. | ........... | 210/440 |
| 7,048,848 B2 * | 5/2006 | Assion | .......................... | 210/117 |

(Continued)

FOREIGN PATENT DOCUMENTS
EP      439901 A1 *    8/1991
(Continued)

OTHER PUBLICATIONS

Office Action issued for corresponding Japanese patent application No. 2005-03889, dated Apr. 30, 2010 (6 pages).

*Primary Examiner* — Terry Cecil
(74) *Attorney, Agent, or Firm* — Hamre, Schumann, Mueller & Larson, P.C.

(57) ABSTRACT

A disposable, spin-on fluid filter for mounting to a fluid-directing head includes a molded housing having a closed base and a sidewall defining a hollow cavity. Filtering media is positioned within the hollow cavity and a nutplate is joined to the housing so as to enclose the filtering media. The nutplate includes a plurality of inlet flow openings and a lobed sleeve extending into the filtering media. An endplate is joined to the filtering media including a flange portion and a sleeve portion. The fluid filter includes an elastomeric valve having a first portion positioned between the flange portion and the inlet flow openings and a second portion positioned between the sleeve portion and the lobed sleeve. The valve provides an anti-drain back capability and in cooperation with the lobed sleeve provides a filtering media by-pass capability.

23 Claims, 22 Drawing Sheets

U.S. PATENT DOCUMENTS

2002/0074281 A1* 6/2002 Steger et al. .................. 210/444
2005/0077220 A1* 4/2005 Cline ........................... 210/130

FOREIGN PATENT DOCUMENTS

| JP | 59-190318 | 12/1984 |
| JP | 61-121911 | 8/1986 |
| JP | 64-52515 | 3/1989 |
| JP | 8-135428 | 5/1996 |
| JP | 10-128014 | 5/1998 |
| JP | 11-6575 | 1/1999 |
| JP | 11-197411 | 7/1999 |
| JP | 2001-234724 | 8/2001 |
| JP | 2002-210309 | 7/2002 |

* cited by examiner

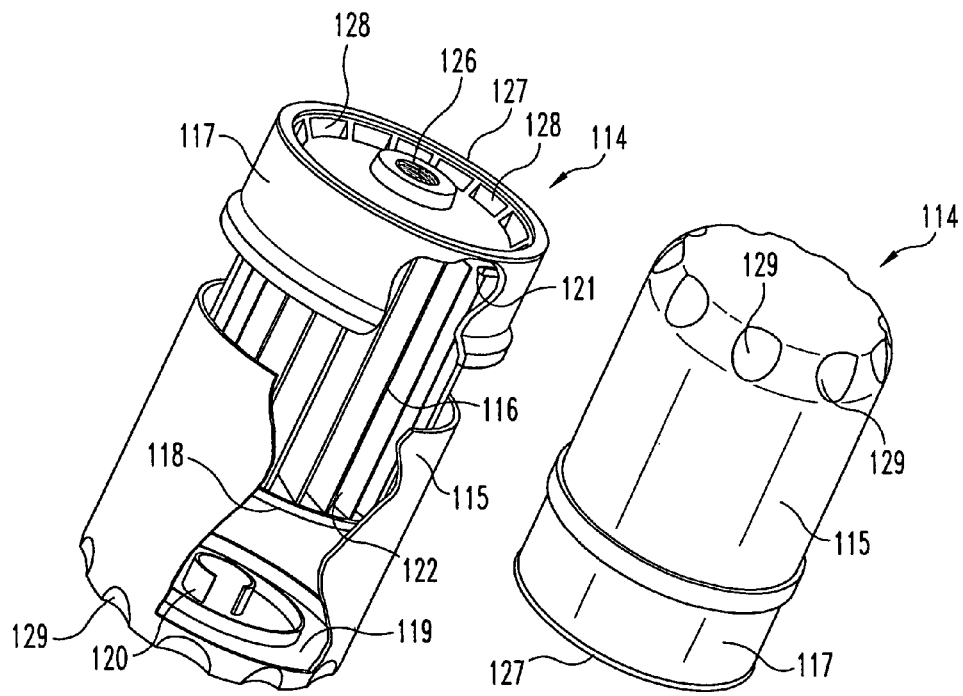
*Fig.16*  *Fig.17*
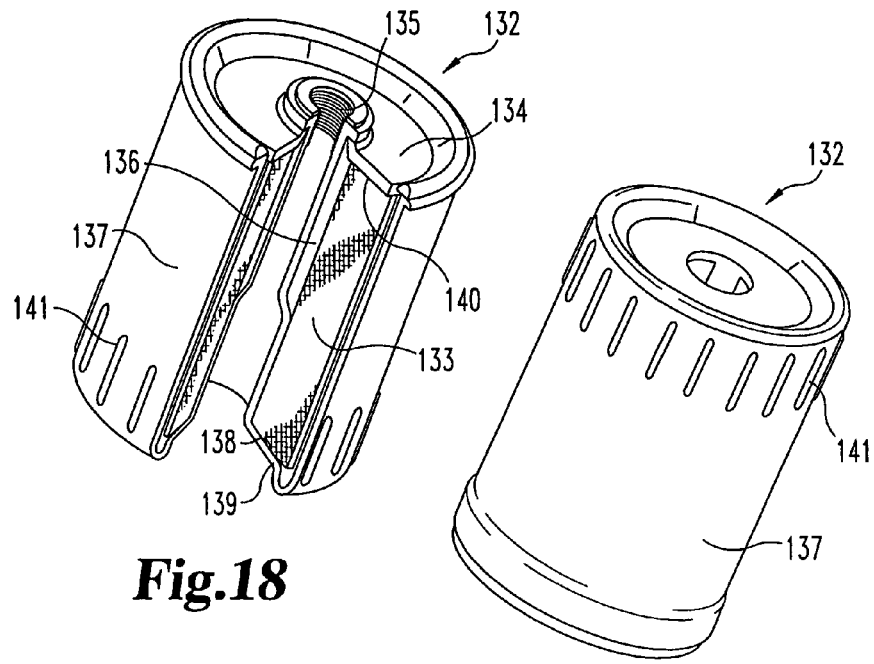
*Fig.18*  *Fig.19*

US 8,177,967 B2

SPIN-ON FILTER WITH PERFORMANCE ENHANCEMENT FEATURES

BACKGROUND OF THE INVENTION

The present invention relates in general to the design and construction of a fluid filter that includes various design choices and options that help to reduce the overall cost of the fluid filter. These choices and design options include the design and redesign of component parts and features as well as the overall fabrication method that is used to create the fluid filter.

One consideration in the design of a fluid filter is cost control. Due to the high market volume for fuel filters and lube filters, for example, even relatively small cost cutting measures can add up to substantial savings for larger customers, such as fleet operators. If design and redesign modifications can be made to the typical or traditional fluid filter resulting in the elimination of one or more component parts, a cost savings is realized from the standpoint of eliminating a component part and its associated cost as well as eliminating one or more assembly steps relating to that component part. When there are cost savings from improvements in the fabrication and assembly steps that must be performed to create the fluid filter, these can be significant in terms of labor dollars.

One consideration in the design and/or redesign of fluid filter components is whether the fluid filter structure can be made non-metallic or predominantly non-metallic. A fluid filter design that is predominantly non-metallic, preferably all plastic, is considered "disposable" since it can be incinerated for disposal or can be recycled, depending on the selected materials. By providing a construction that is incineratable, the structural mass of the filter can be reduced to low volume ash and this limits what will be added to landfills. The other option for "disposal" is to recycle the plastics used in the construction of the fluid filter. Presently, when there is a fluid filter construction that is substantially all plastic, it is normally described as having an "environmentally friendly, green design".

Recognizing that there is value in a predominantly all-plastic fluid filter construction and that there is value in a reduction in the number of component parts comprising the fluid filter, the present invention is directed to these two objectives. A number of design improvements are offered by the present invention, as described herein, and each improvement has independent value such that it can most likely be incorporated independently of any other improvements. Nevertheless, a number of the present invention improvements can be incorporated together into the redesigned fluid filter due to their design compatibility. The fluid filter improvements according to the present invention are considered to be novel and unobvious.

SUMMARY OF THE INVENTION

A fluid filter for mounting to a fluid-directing head according to one embodiment of the present invention comprises a housing having a closed base and a sidewall defining a hollow cavity, filtering media defining an open interior and being positioned in the hollow cavity, a nutplate joined to the housing and being constructed and arranged to enclose the filtering media, the nutplate defining a plurality of inlet flow openings and including a sleeve extending into the open interior, the sleeve providing an exit flow conduit, an endplate joined to the filtering media and including a flange portion and a sleeve portion, and an elastomeric, flow-control valve having a first portion positioned between the flange portion of the endplate and the inlet flow openings and a second portion positioned between the sleeve portion of the endplate and the nutplate sleeve, wherein the first portion provides an anti-drain back capability and the second portion in cooperation with the sleeve provides a filtering media by-pass capability.

One object of the present invention is to provide an improved fluid filter.

Related objects and advantages of the present invention will be apparent from the following description.

BRIEF DESCRIPTION OF THE DRAWINGS

FIG. 16 is a fragmentary, partially exploded perspective view of a fluid filter according to the present invention.

FIG. 17 is a perspective view of the FIG. 16 fluid filter.

FIG. 18 is a perspective view, in partial section, of a fluid filter according to the present invention.

FIG. 19 is a perspective view of the FIG. 18 fluid filter.

DESCRIPTION OF THE PREFERRED EMBODIMENTS

Figure 1:
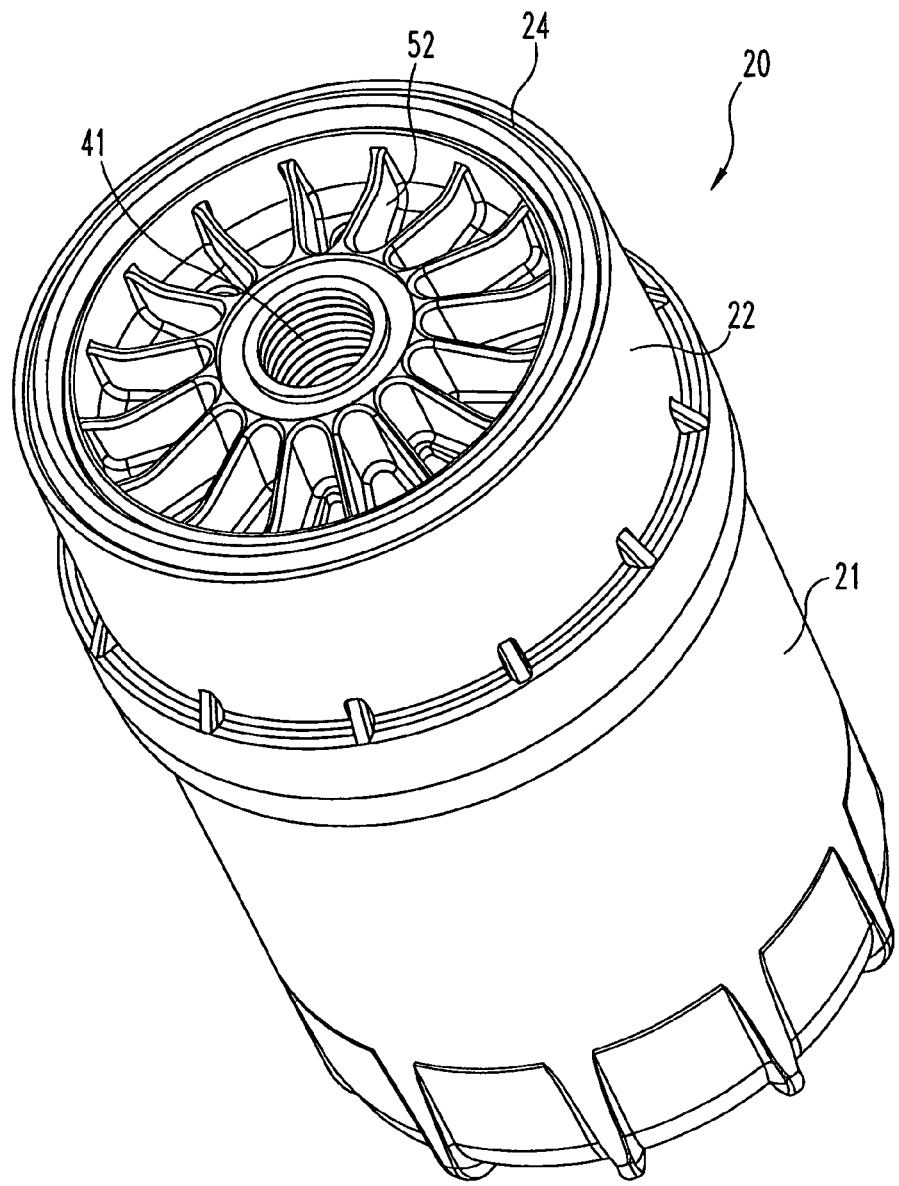
FIG. 1 is a perspective view of a fluid filter according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 8:
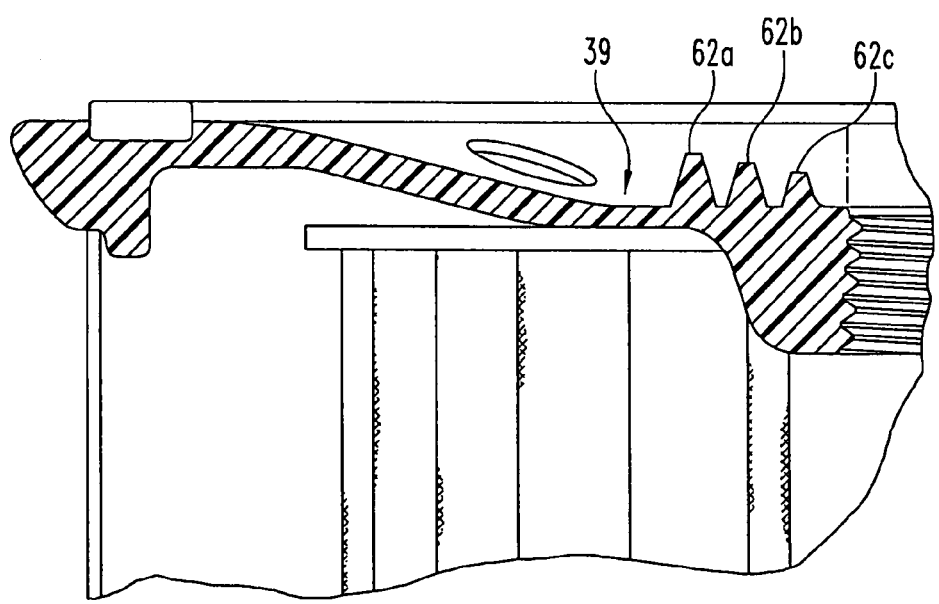
FIG. 8 is a partial, front elevational view, in full section, of an alternative nutplate design showing a plurality of crush ribs, similar to what is employed as part of FIG. 7.
Figure 9:
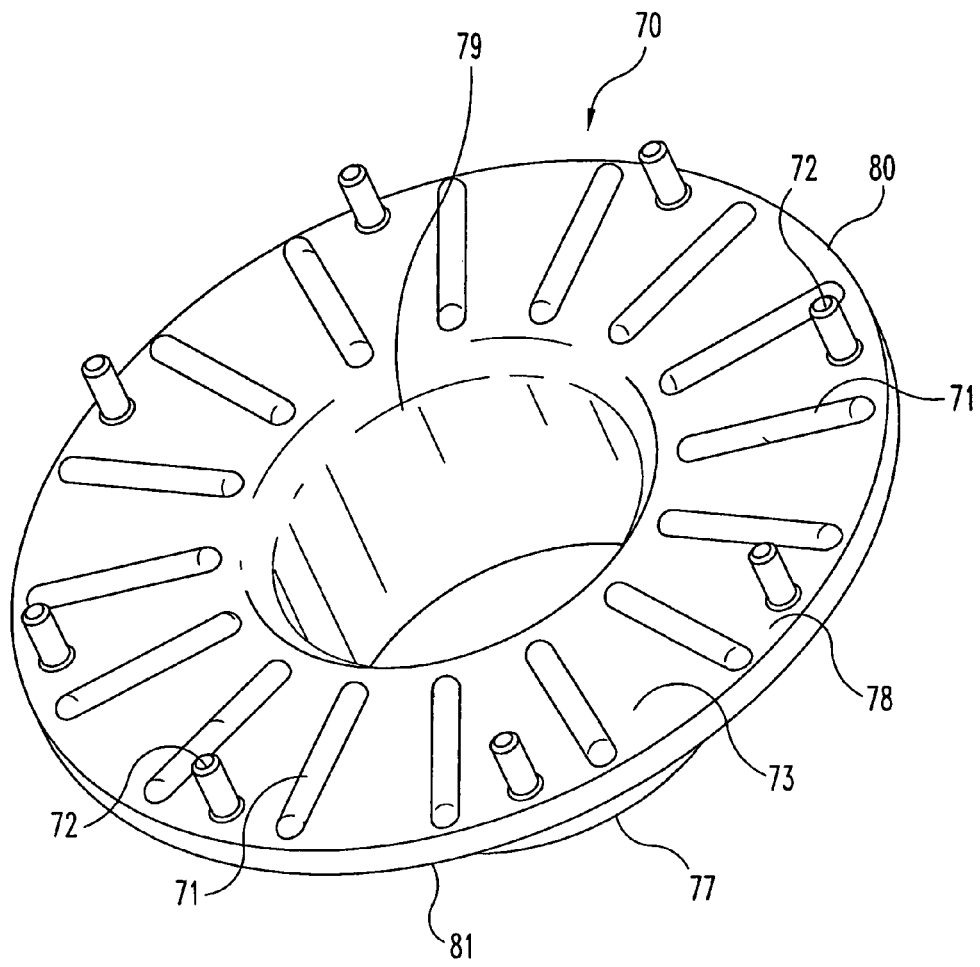
FIG. 9 is a perspective view of a top endplate comprising a portion of a fluid filter according to the present invention.
Figure 10:
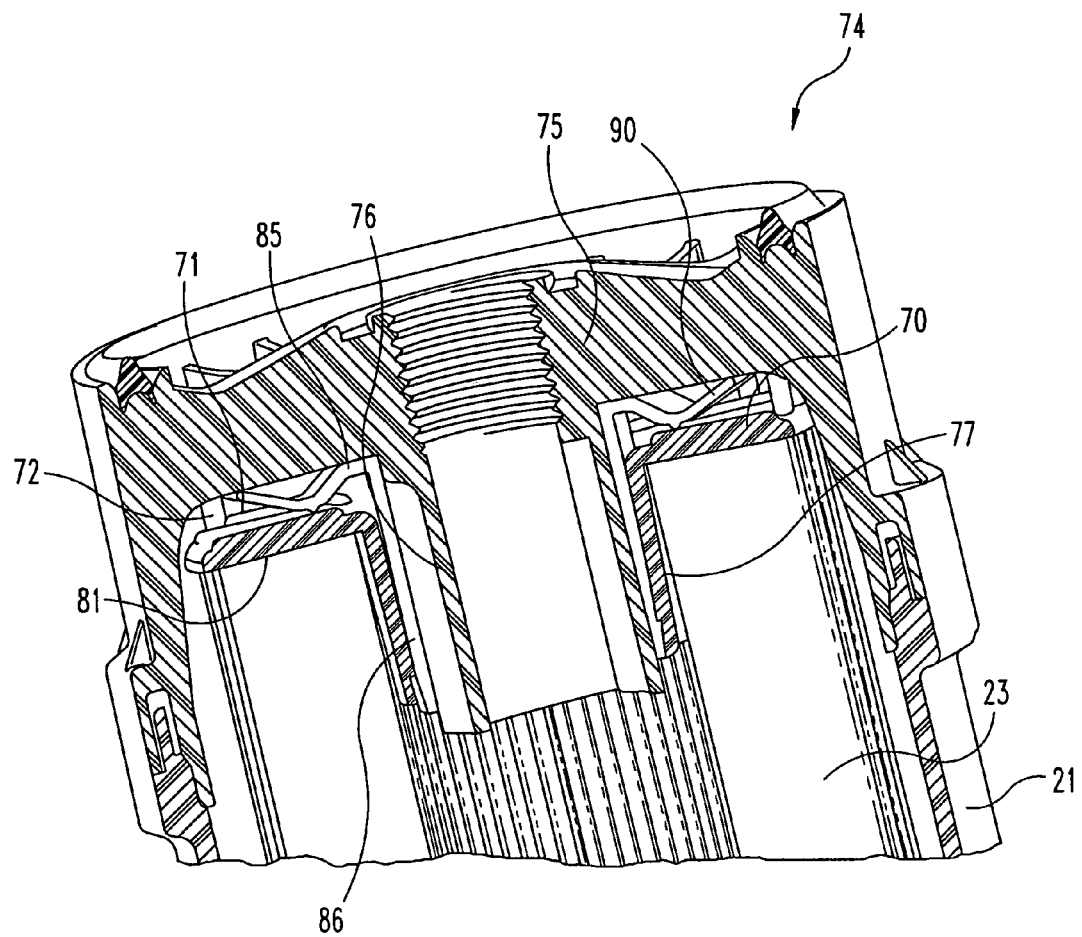
FIG. 10 is a partial, front elevational view of a fluid filter incorporating the FIG. 9 top endplate.

Referring to FIGS. 1-7, a fluid filter 20 is illustrated according to the present invention. The fluid filter improvements that are part of fluid filter 20 will be disclosed in the context of explaining the structure and operation of fluid filter 20 as FIGS. 1-7 are described. In FIG. 8, an alternative embodiment to one of the fluid filter improvements is disclosed but is not provided as part of fluid filter 20. Additionally, the endplate improvement of FIG. 9 is shown in FIG. 10 as being incorporated into a fluid filter which is based upon the fluid filter 20 style of FIG. 2. Beginning then with the fluid filter of FIGS. 1-7, the illustrated fluid filter 20 is a fully disposable, molded plastic, spin-on filter. The fluid filter 20 includes a housing or canister 21, nutplate 22, filtering media 23, and face seal 24. The unitary housing 21 includes a closed base 29 and an annular sidewall 30 terminating in an annular free edge 31 that defines annular open end 32. Free edge 31 is formed with a lip 33 for connection to nutplate 22. The closed base 29 and sidewall 30 cooperate to define a hollow interior 34. The inner surfaces of base 29 and sidewall 30 are formed with a series of spaced-apart ribs 35 which are designed to provide additional strength and rigidity to housing 21. Recess 29a is configured with a one-way ½ inch drive feature that only allows removal of the fluid filter 20.

Figure 2:
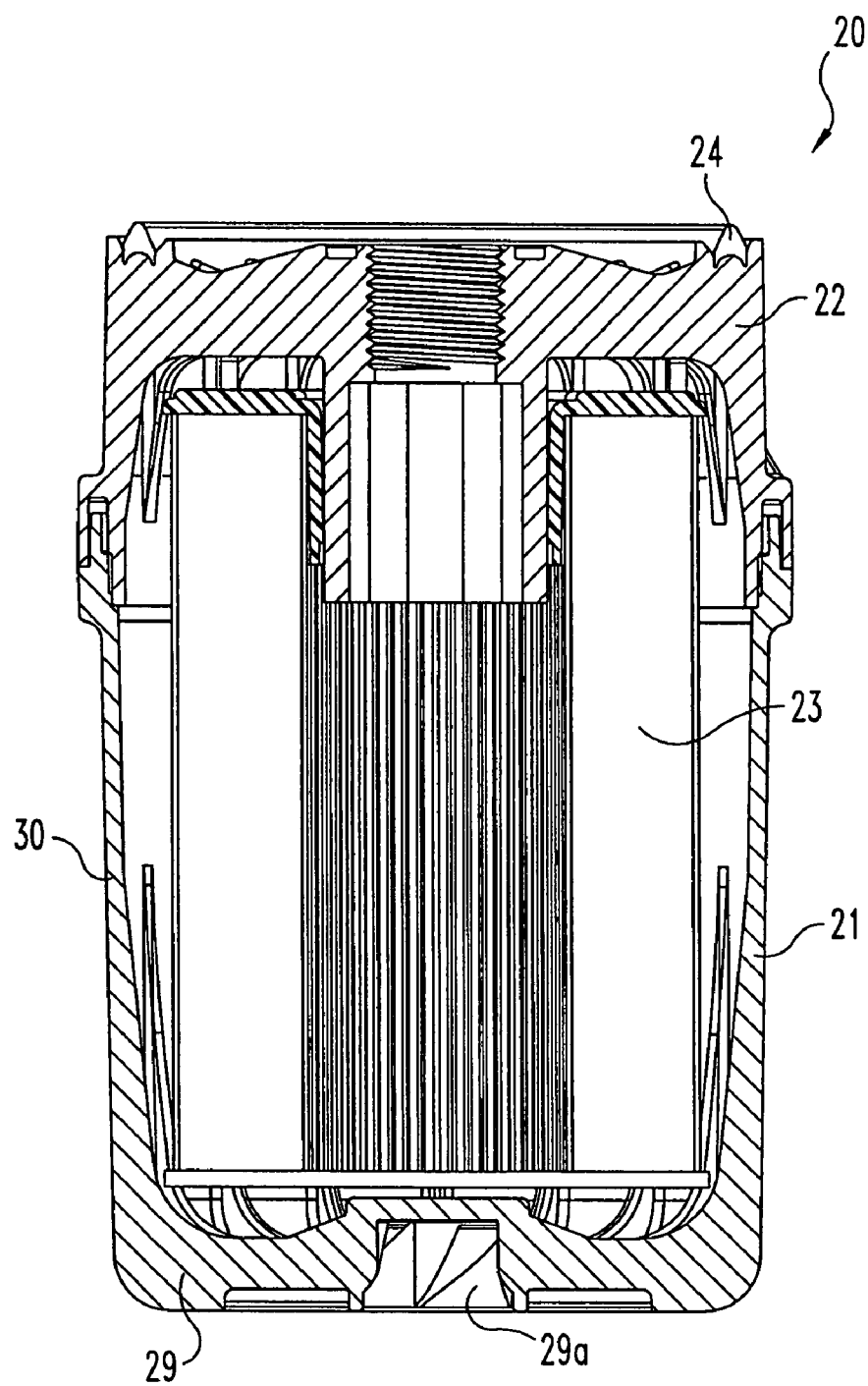
FIG. 2 is a front elevational view, in full section, of the FIG. 1 fluid filter.
Figure 3:
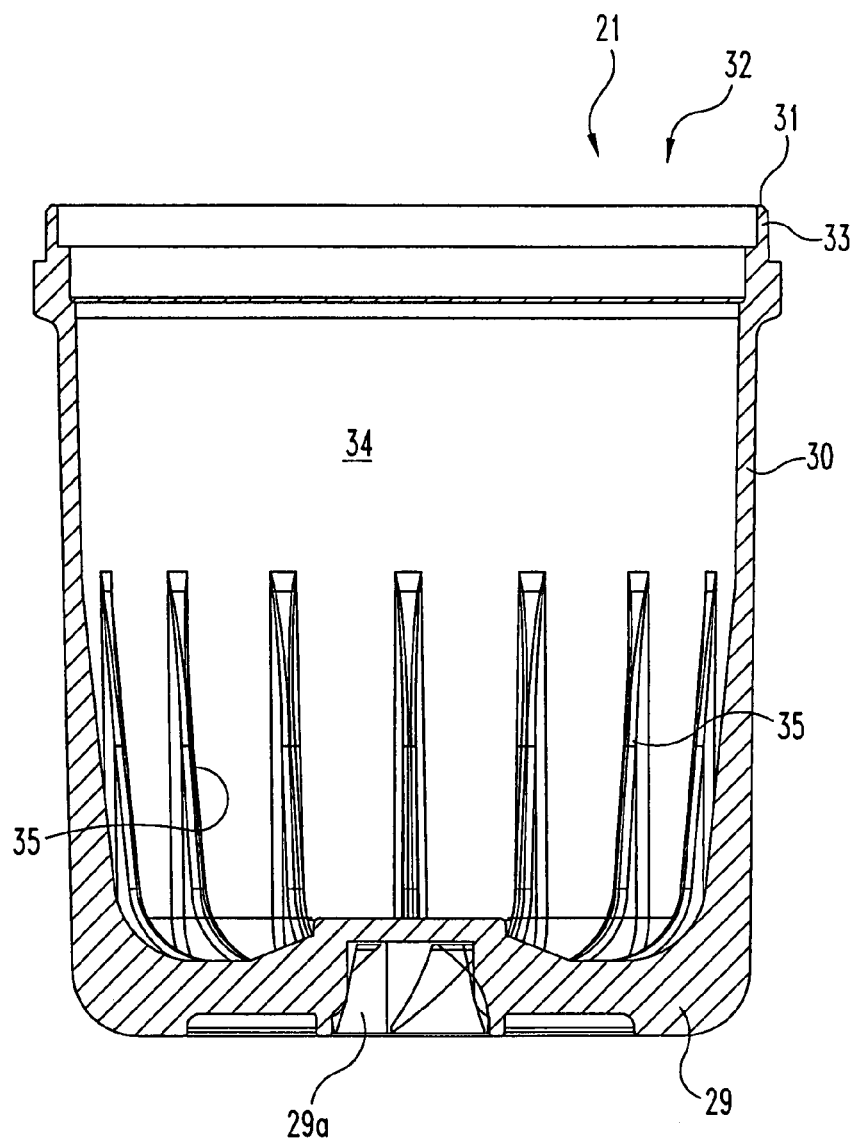
FIG. 3 is a front elevational view, in full section, of a canister comprising a portion of the FIG. 1 fluid filter.

The unitary nutplate 22 illustrated in FIGS. 1 and 2 is detailed in FIGS. 4-7. A slightly different nutplate 39 is illustrated in FIG. 8. This FIG. 8 illustration is included as part of this disclosure in order to depict that one of the improvement features of the present invention can be included as part of a different nutplate design, thereby providing greater breadth and versatility to the disclosed inventive features.

Figure 4:
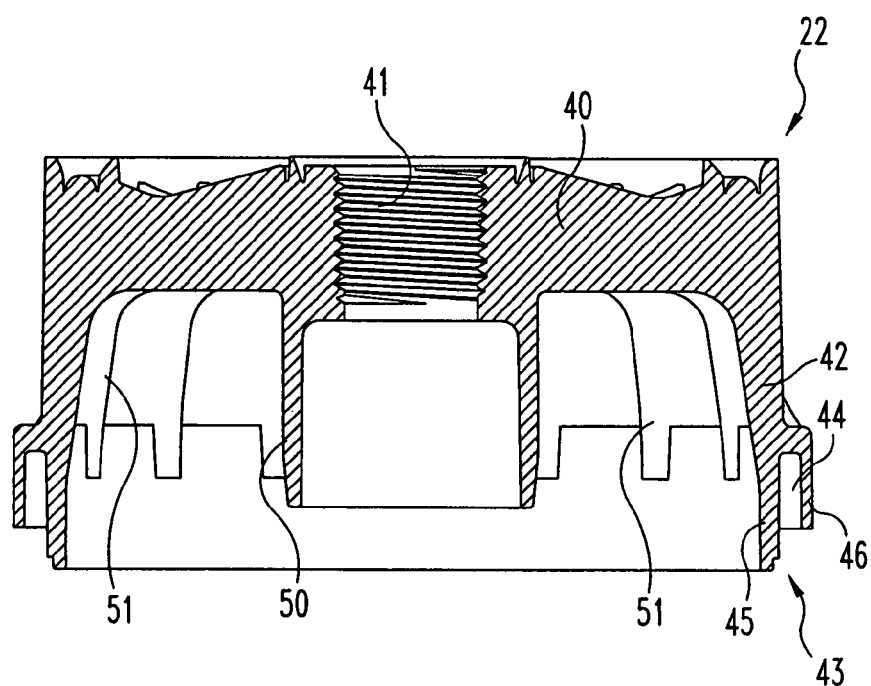
FIG. 4 is a front elevational view, in full section, of a nutplate comprising a portion of the FIG. 1 fluid filter.

Referring now to FIG. 4, nutplate 22 includes a mounting portion 40 that defines an internally-threaded bore 41 and an annular sidewall 42. Sidewall 42 terminates in an annular free end 43 that is formed with an annular channel 44 positioned between inner wall 45 and outer wall 46. Channel 44 is constructed and arranged to receive lip 33 for securely joining together housing 21 and nutplate 22. The connection between housing 21 and nutplate 22 that results in capturing and sealingly enclosing filter media 23 may be by means of a spin weld or by using a suitable adhesive. Other options for the connection between housing 21 and nutplate 22 include the use of "Emabond", sonic welding, and the use of a threaded connection or possibly a bayonet connection so as to simplify the assembly task with a quarter-turn or half-turn assembly technique.

The inner surface of nutplate 22 that is defined by mounting portion 40 and sidewall 42 includes cylindrical sleeve 50 that is concentric to threaded bore 41 and a series of spaced-apart ribs 51. These ribs 51 are included to provide additional strength and rigidity to the nutplate 22. Due to the fact that the housing 21 and nutplate 22 are intended to be of an all-plastic construction, and considering the pressurizing of the fluid filter, having additional strength and rigidity for these plastic components may be advantageous. Since the ribs 35 and 51 can be easily molded as part of their corresponding component parts, due to the molded plastic construction, the addition of ribs 35 and 51 do not represent a significant cost addition.

Figure 5:
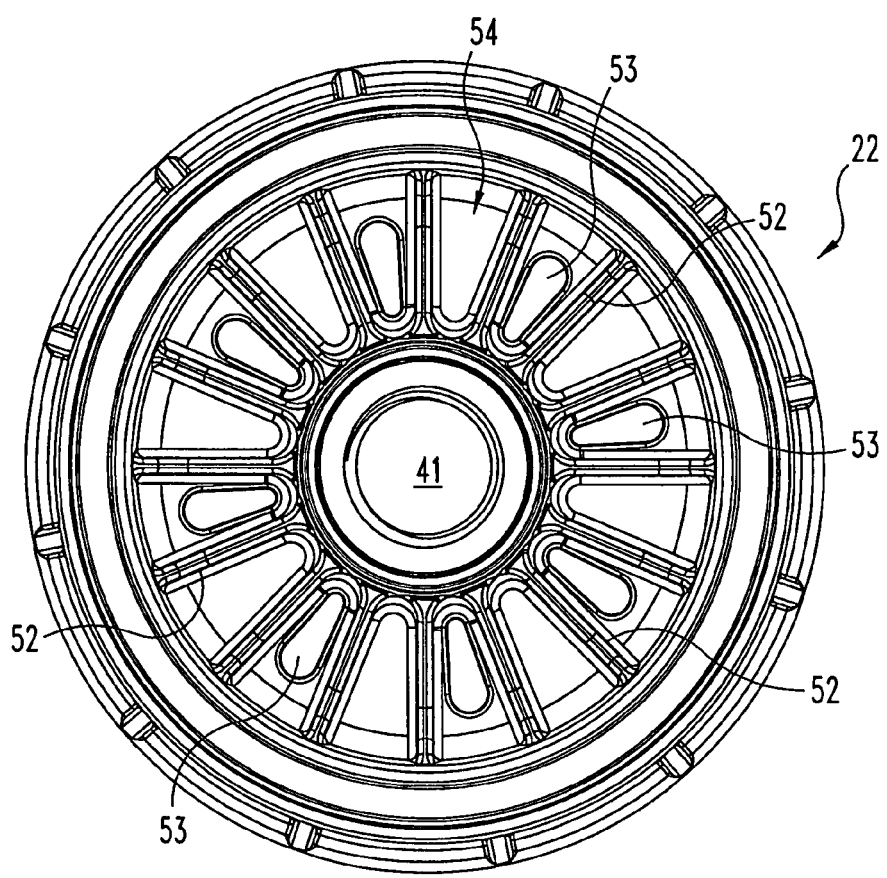
FIG. 5 is a top plan view of the FIG. 4 nutplate, according to the present invention.
Figure 6:
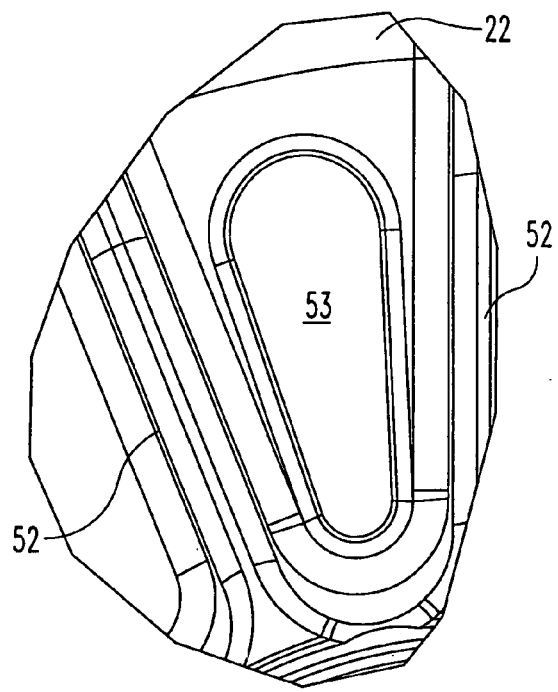
FIG. 6 is an enlarged, top plan view of one portion of the FIG. 5 nutplate detailing a flow opening.

In order to provide structural support between the wall portion surrounding the threaded bore 41 and the outer wall of the mounting portion 40, a radiating pattern of connecting ribs 52 is provided (see FIG. 5). In order to provide for incoming fluid flow through the nutplate 22 for processing by filtering media 23, a series of openings 53 are defined by the mounting portion 40. There is one opening 53 positioned between alternating pairs of adjacent connecting ribs 52. Based upon the FIG. 5 illustration, it is intended that the connecting ribs 52, sixteen total, be equally-spaced in a spoke-like array centered on threaded bore 41 and outwardly radiating from the axial centerline of bore 41. The sixteen triangular pockets 54 defined by the sixteen connecting ribs 52 provide the locations for the eight, tear drop-shaped flow openings 53. The spacing between adjacent flow openings 53 is uniform such that there is circumferential symmetry to the nutplate structure, as illustrated in FIG. 5.

When a metal nutplate is used in a spin-on fluid filter, the material strength generally precludes any concerns about strength and rigidity, assuming a suitable material choice and thickness. With a metal nutplate, the flow openings are normally circular (i.e., cylindrical bore) as this is the most convenient shape to be stamped into the nutplate. However, when there is a desire to go to an all-plastic fluid filter construction, such as that envisioned for fluid filter 20 according to the present invention, any metal nutplate is replaced with a molded plastic nutplate. This in turn requires design changes to the structure in order to provide the requisite strength and rigidity due to the change in materials. This is part of why nutplate 22 includes strengthening members such as the series of ribs 51 and connecting ribs 52. The presence of connecting ribs 52 generates certain spacing and clearance considerations for the flow openings 53. Since the plastic nutplate 22 is a unitary, molded member, there is no finished machining required in order to create the flow openings 53. These openings 53 are molded into the nutplate 22. While these openings could be molded in between every pair of adjacent webs 52, that could weaken the nutplate 22. When only eight openings 53 are provided, as in the present invention, each opening 53 needs to provide a sufficient projected flow area to permit adequate flow to the filtering media. The equally-spaced pattern ensures good fluid distribution around the exterior of the filtering media 23. In order to provide the requisite flow area per opening 53, each opening 53 has a tapered, tear drop shape as shown in FIG. 5 and in greater detail in FIG. 6.

In addition to the benefits of an all-plastic fluid filter construction in terms of making the fluid filter "disposable", changing from metal to plastic for certain component parts of the fluid filter 20 enables other design changes to be made. These design changes may result in the elimination of one or more component parts that were required with prior art fluid filters. As one example of this, consider that with a metal nutplate as part of a prior art fluid filter, a seal is positioned around the threaded bore of the nutplate so as to seal against the mounting head that surrounds the threaded spud that is received by the nutplate. While the threaded engagement may prevent leakage, that is not guaranteed and the use of an annular seal around that threaded interfit provides additional security against fluid leakage.

Figure 7:
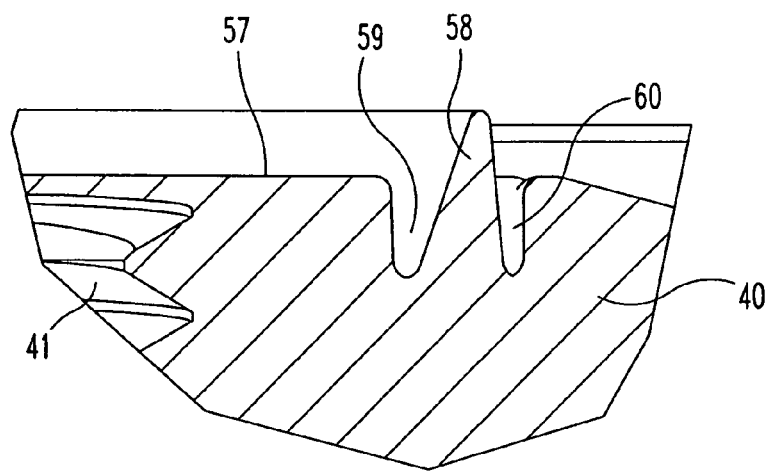
FIG. 7 is a partial, front elevational view, in full section, of one portion of the FIG. 4 nutplate detailing an annular crush rib.

One of the improvements offered by the present invention and enabled by changing to a plastic nutplate is detailed in FIG. 7. The annular upper surface 57 surrounding threaded bore 41 includes a raised, annular finger or crush rib 58. Ignoring the taper of crush rib 58 for now, it is generally cylindrical and extends, uninterrupted, completely around bore 41. Annular clearance channels 59 and 60 are positioned on opposite sides of crush rib 58, as is illustrated in the FIG. 7 detail. The clearance channels 59 and 60 provide space for expansion of crush rib 58 as it is axially compressed. Crush rib 58 axially extends above surface 57 such that as the mounting portion 40 of nutplate 22 is drawn up against the mounting head that receives fluid filter 20, the crush rib 58 is compressed due to the abutting force and is able to compress or flatten out, thereby deforming or crushing the protruding crush rib 58, a result which is due in part to its material properties and due in part to its size, shape, and location. The crushing or compression of crush rib 58 causes it to expand and the clearance channels 59 and 60 provide space for this expansion. The use of crush rib 58 allows the smaller inner seal or inner gasket normally associated with a spin-on fluid filter to be eliminated.

In FIG. 8, a different molded plastic nutplate 39 is illustrated and there are three plastic fingers or crush ribs 62a, 62b, and 62c, each one having a slightly different axial height. This illustration is intended to further convey the understanding that the number of crush ribs or fingers can be one, two or three, or conceivably even more than three. This illustration is also intended to convey the understanding that the molded plastic crush rib can be incorporated into other nutplate styles, and is not limited to the style of nutplate 22. One perceived advantage of having multiple plastic crush ribs for sealing is that, as the filter is attached or mounted to the head, additional torque is required to crush the second or third crush rib. There is thus a feedback regarding the torque that is felt as the fluid filter is mounted and as successive crush ribs are crushed. An additional benefit is that multiple crush ribs provide additional sealing integrity, particularly if a single crush rib might not properly engage the entire surface with the desired sealing contact.

One benefit of being able to eliminate the inner seal or gasket that surrounds the nutplate-to-head threaded connection is the elimination of the component part cost. A related benefit includes a reduction in labor cost to install or package the gasket and elimination of any risk that a required component part will not be provided or will be lost prior to installation.

Referring now to FIGS. 9 and 10, another improvement for a disposable, spin-on fluid filter according to the present invention is illustrated. FIG. 9 discloses a top endplate 70 that includes ribs 71 and standoffs 72 that are molded into the upper surface 73. It is envisioned that the endplate 70 will include both ribs 71 and standoffs 72, though their specific functions are different and technically could be provided independently of one another. For example, the ribs 71 provide one function which is independent of the function provided by standoffs 72. Since these two are independent of one another, a suitable endplate, such as endplate 70, could include either ribs 71 or standoffs 72, or both.

Further, in the context of the improved top endplate 70, it will be noted that this particular improvement, either ribs 71 or standoffs 72 or both, can conceivably be used as the only improvement as part of fluid filter 20 or may be used along with other improvements. To the extent that fluid filter 20 includes nutplate 22 and since nutplate 22 could be interpreted as a required part of fluid filter 20, a new fluid filter 74 (see FIG. 10) is identified in the context of the FIG. 9 improvement. However, fluid filter 20 and fluid filter 74 are substantially the same and in fact several of the features embodied in fluid filter 74 are consistent with fluid filter 20. The point is not to suggest that these two fluid filters are different. Rather, the point is to suggest that, depending on the improvements that are included or excluded in any particular fluid filter, the actual fluid filter configuration might vary slightly and, on that basis, would be deserving of a different reference number. Consistent with this explanation, fluid filter 74 of FIG. 10 generally corresponds to the configuration of the fluid filter 20, except for the nutplate. Nutplate 22 (see FIG. 4) includes cylindrical sleeve 50 and, while this nutplate design is acceptable for fluid filter 74, a new nutplate style is used (see FIG. 13). The primary difference between nutplate 22 and nutplate 75 is that sleeve 50 is cylindrical and sleeve 76 has a lobe design, four lobes total.

Top endplate 70 is a unitary, molded plastic component with an inner, hollow sleeve 77 and a concentric radial flange 78, the upper surface 73 of which includes ribs 71 and standoffs 72. Preferably, whichever feature or features are selected, their arrangement will have circumferential uniformity and symmetry. In the FIG. 9 illustration, there are sixteen ribs and eight standoffs. The ribs are equally spaced-apart and are arranged in a radiating, spoke-like array, extending from a location generally adjacent to inner edge 79 to a location that is generally adjacent to outer edge 80. The standoffs 72 are equally spaced-apart and are located just inwardly of outer edge 80.

It is envisioned that the filtering media 23, or what might be referred to as a "media pack", will be imbedded into or bonded to facing surface 81 of endplate 70. Endplates of prior art designs are normally used to perform one or more of the following functions. These functions include closing off the ends of the filtering media, keeping the filtering media pleats properly spaced, and supporting the spring to hold the filtering media up against the nutplate, creating a seal to the nutplate and housing a by-pass valve.

One of the considerations with a fluid filter, whether lube or fuel, is the need to keep the top endplate spaced apart from the nutplate such that the fluid inlet flow openings in the nutplate are not closed off by contact with the surface of the endplate. The designed standoffs 72 are used to maintain an acceptable spacing between upper surface 73 and nutplate 75. It will be noted that the axial height of the standoffs 72 are set such that contact is made and the desired spacing is created.

When the fluid filter design 20 or 74 is directed to a lube application, the flow ribs 71 are used to keep any anti-drain back valve from closing off the flow circuit to the by-pass valve. These features and characteristics will be described in greater detail later in the context of other component part redesigns and fluid filter improvements.

Figure 11:
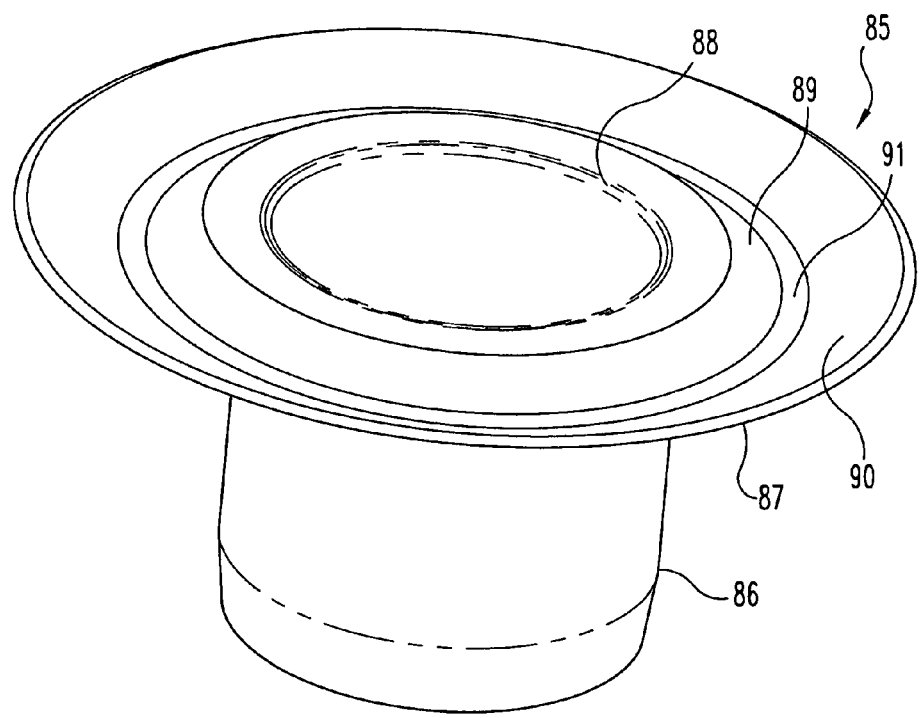
FIG. 11 is a perspective view of an anti-drain back valve and by-pass valve combination comprising an improvement feature according to the present invention.
Figure 12:
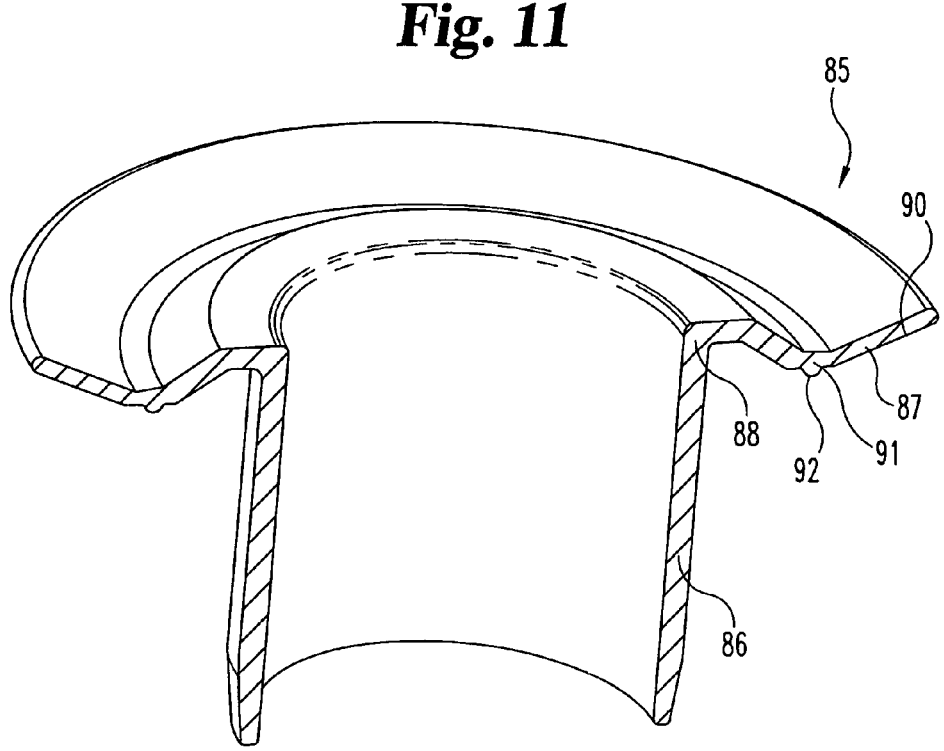
FIG. 12 is a perspective view, in full section, of the FIG. 11 valve.

Referring to FIGS. 10-13, another improvement for a fluid filter, according to the present invention, is illustrated. FIGS. 11 and 12 disclose the construction of a unitary, elastomeric valve 85 that is constructed and arranged to combine both anti-drain back valve and by-pass valve capabilities. While these functions are able to be performed in cooperation with other structural features of the fluid filter, valve 85 still represents an improvement to the fluid filter construction.

Valve 85 includes a generally cylindrical sleeve 86 and a radiating flange 87 in unitary construction with sleeve 86 adjacent end 88. Flange 87 includes a pair of annular sections 89 and 90 that are inclined and converge toward and are adjacent to the intermediate section 91 that includes annular rib 92. The flexibility of the elastomeric material used for valve 85 enables it to perform as intended as part of a fluid filter.

Referring to FIG. 10, valve 85 is installed in a fluid filter and a suitable fluid filter to explain the functioning of valve 85 is fluid filter 74. While fluid filter 20 is similar in many respects, the use of nutplate 75 is important to explain the use of valve 85. In view of the designed cooperation between sleeve 86 and lobed sleeve 76 of nutplate 75, the fluid filter 74 of FIG. 10 must be used as the installation basis for valve 85. As illustrated in FIG. 10, fluid filter 74 includes a housing 21, nutplate 75 (see FIG. 13), and filtering media 23. Also included is top endplate 70 that includes the disclosed ribs 71 and standoffs 72. Alternate configurations for nutplate sleeve 76 are illustrated in FIGS. 13A through 13D. While the nutplate sleeves 76a through 76d are each configured differently, they each cooperate with valve sleeve 86 to enable a by-pass capability, as described herein.

As is illustrated in FIG. 10, endplate 70 is joined to the upper end of the filtering media 23 and sleeve 77 extends axially down into the hollow interior of the filtering media. In this configuration, the standoffs 72 contact the facing surface of nutplate 75. This establishes and maintains a sufficient clearance between the filtering media 23 and nutplate 75 such that the inlet flow openings 53 in the nutplate are not closed off by abutment of the filtering media.

The anti-drain back feature of valve 85 is provided by inclined section 90 and its positioning over the flow openings 53. When there is a sufficient fluid force or pressure difference due to the incoming fluid flow, the flange section 90, functioning as a closure flap, deflects allowing fluid flow between nutplate 75 and valve 85. When the fluid force or pressure is removed or reversed, the flange section 90 resiliently returns to the FIG. 10 closed condition.

With regard to the by-pass feature or capability provided by valve 85, it should be noted first that sleeve 86 is positioned around lobed sleeve 76 and is positioned between the hollow sleeve 77 of endplate 70 and sleeve 76. The same structural configuration exists if any of the alternate nutplate sleeve designs 76a-76d are used. See FIGS. 13A-13D. Under normal operating conditions with the filtering media functioning properly, there is a pressure balance between the interior and exterior of the filtering media. In this condition, the lobes 95 of sleeve 76 hold sleeve 86 against sleeve 77 to close off any flow path between sleeve 77 and sleeve 86 that would permit the incoming flow to short cut or by-pass the filtering media. However, if a flow restriction develops and there is a need or desire to by-pass the filtering media, then valve 86 needs to "open" for this desired by-pass capability. Since there is now a pressure difference due to the restriction, the sleeve 86 is pulled against lobed sleeve 76. This in turn creates flow openings or corridors, four in number, between sleeve 77 and sleeve 86 and the by-pass function is complete. With regard to current or prior designs, typically current fluid filters are designed with a rubber anti-drain valve and a metallic by-pass valve. The anti-drain valve can be used for lube applications, as one example, where the filter orientation is horizontal or open-end down which allows the oil to drain out of the filter when the engine is off. When the engine is off, the valve seals the flow holes of the nutplate to prevent the reverse oil flow out of the filter. The by-pass valve is needed to relieve the differential pressure (which is caused during cold start, a pressure spike during operation, or a clogged filter) prior to the collapse strength of the filter media or the centertube. The construction of by-pass valves are similar in design consisting of a metal spring (helical or stamped), a plunger, and a retainer.

Figure 13:
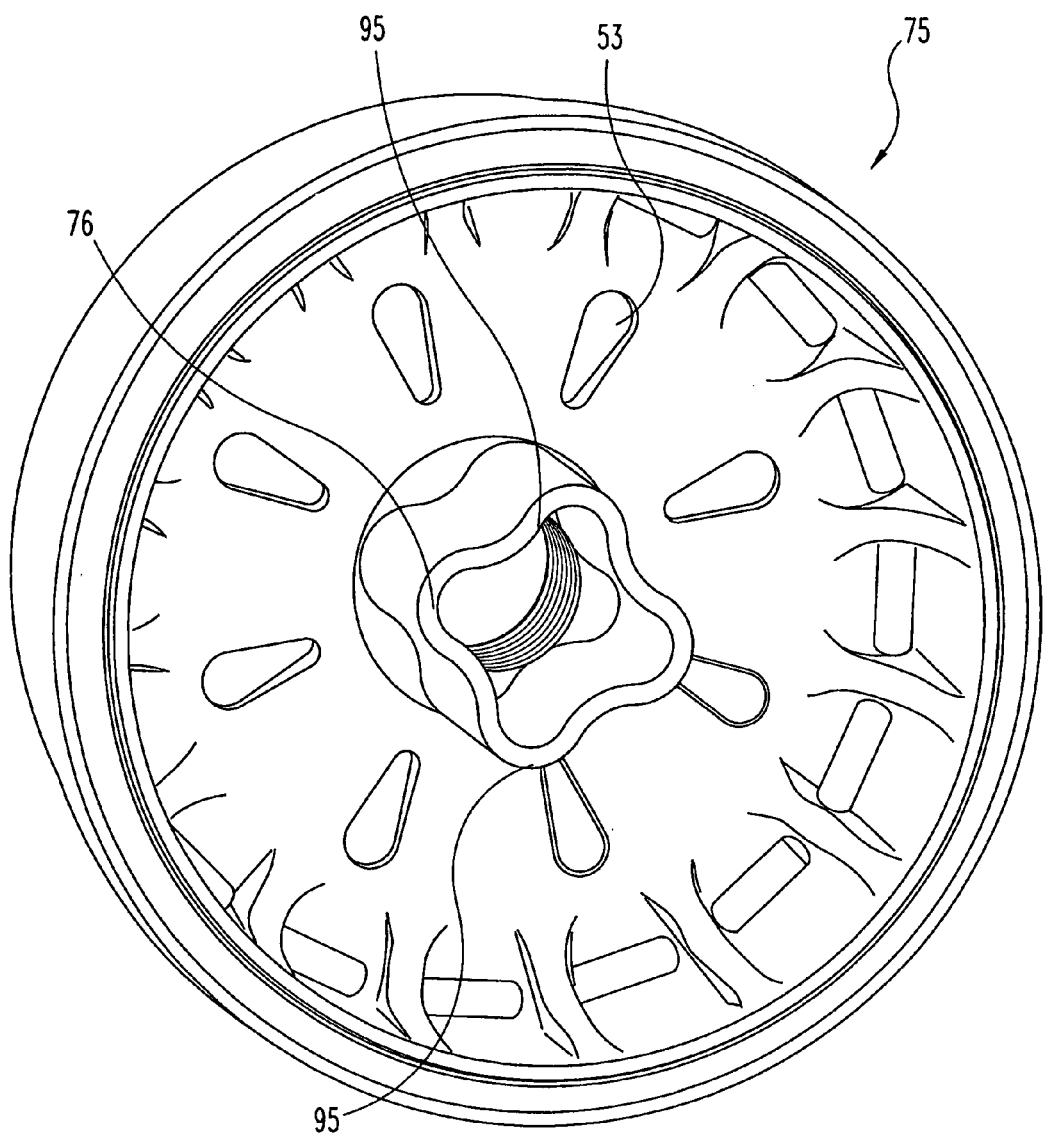
FIG. 13 is a bottom perspective view of a nutplate with a lobed sleeve, according to the present invention, for cooperating with the FIG. 11 valve.
Figure 13A:
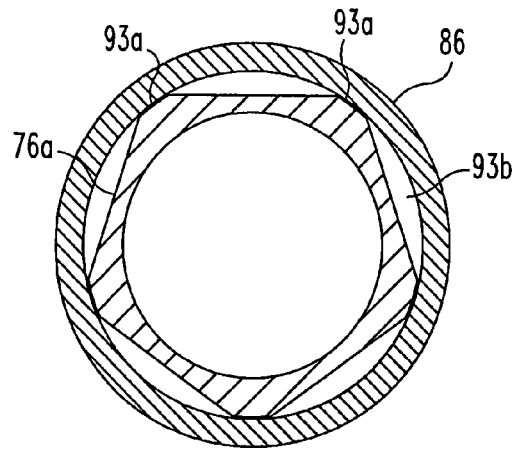
FIG. 13A is a top plan view, in full lateral section, of an alternative nutplate sleeve configuration according to the present invention.
Figure 13B:
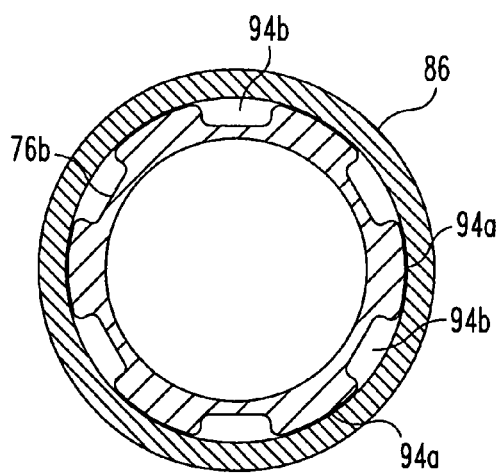
FIG. 13B is a top plan view, in full lateral section, of an alternative nutplate sleeve configuration according to the present invention.

With regard to the nutplate sleeve alternatives of FIGS. 13A-13D, sleeve 76a is a polygon design such that the lateral section view shows "corners" 93a that contact the inner surface of valve sleeve 86. As will be understood from the FIG. 13A illustration, the straight sides of sleeve 76a extending between adjacent corners 93a result in a void 93b being created between sleeve 76a and valve sleeve 86. These voids 93b provide a clearance space for the movement of sleeve 86 in order to create by-pass flow corridors, as previously described with regard to lobed sleeve 76. In FIG. 13B, sleeve 76.b is configured with ribs 94a that contact the inner surface of valve sleeve 86. In alternating sequence with ribs 94a are channels 94b. The channels 94b provide clearance spaces for the movement of sleeve 86 in order to create by-pass flow corridors.

Figure 13C:
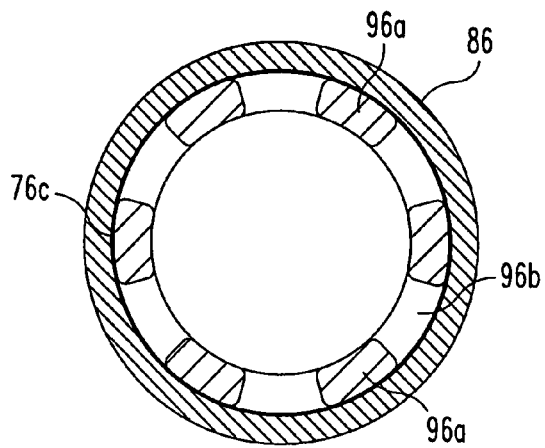
FIG. 13C is a top plan view, in full lateral section, of an alternative nutplate sleeve configuration according to the present invention.

Referring now to FIG. 13C, it will be seen that nutplate sleeve 76c includes posts 96a that are constructed and arranged to be discontinuous relative to the axial length of sleeve 76c. Voids 96b are defined by the body of sleeve 76c and are positioned circumferentially between posts 96a. The voids 96b provide clearance spaces for the movement of sleeve 86 in order to create by-pass flow corridors.

Figure 13D:
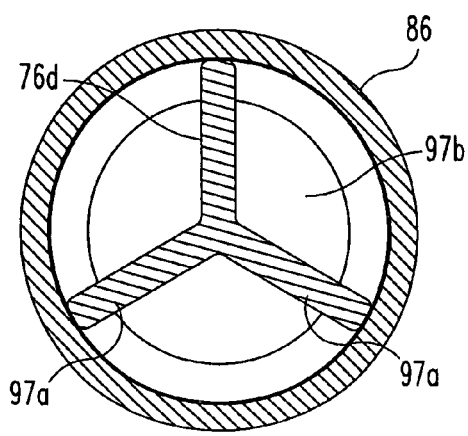
FIG. 13D is a top plan view, in full lateral section, of an alternative nutplate sleeve configuration according to the present invention.

With respect to FIG. 13D, nutplate sleeve 76d is configured with an array of vertical ribs 97a that are joined at the sleeve axis so as to create a spoke-like pattern. The spaces or voids 97b located between adjacent ribs 97a provide clearance spaces for the movement of sleeve 86 in order to create by-pass flow corridors.

The design improvement illustrated in FIGS. 10-13 utilizes plastic and this allows for the design to reduce the number of parts by creating contoured shapes for the corresponding components. The important point to note with regard to the present invention and this particular improvement is that the anti-drain back valve and the by-pass valve are now molded as a single unitary part and the by-pass valve functions correctly when it is incorporated with the lobed sleeve 76 which in the preferred embodiment and as illustrated in FIG. 13 includes four lobes. The by-pass valve portion of valve 85 works in two ways. First, during normal operation, it functions as a seal that prevents the unfiltered particles from re-entraining with the filtered oil. Secondly, this valve opens to relieve the differential pressure prior to the collapse strength of the filtering media or any centertube. Making valve 85 out of rubber has another advantage in that it allows the valve to function properly over a wide range of pressures and temperatures.

Figure 14:
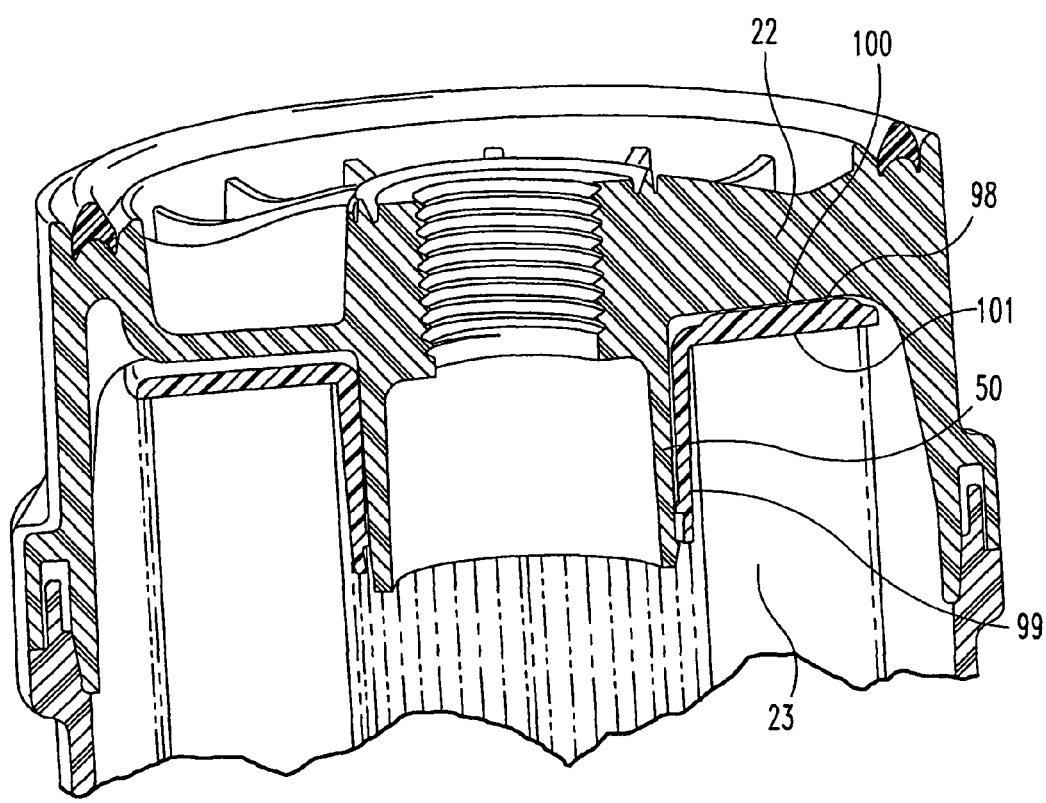
FIG. 14 is a partial, front elevational view, in full section, of a fluid filter incorporating a direct seal between an endplate and a nutplate, according to the present invention.

With reference to FIG. 14, another improvement for the present invention is illustrated. When nutplate 22 is used in a fluid filter, the sleeve 50 provides a smooth, generally cylindrical surface that can be used for sealing in order to prevent unfiltered particles from by-passing the filtering media. In order to do so, the present invention provides an annular endplate 98 that creates an internal seal against sleeve 50.

Endplate 98 includes a generally cylindrical sleeve 99 and a radiating flange 100 that is joined to the upper end 101 of the filtering media 23. The filtering media 23 can be bonded to endplate 98 by various techniques, including "embedding" the filtering media 23 into flange 100. This embedding step is achieved by first heating the flange 100 in order to soften the plastic and then forcing the end of the filtering media into the softened plastic, allowing it to harden in place. By the proper sizing and shaping of sleeve 99 relative to sleeve 50, an interference press-fit is established along their cylindrical contact. Although referred to as cylindrical, a slight taper on one or both sleeves will facilitate the interference fit assembly without sacrificing the ability to establish over a generally cylindrical surface a suitable interference press-fit for adequate sealing.

In the context of this improvement, according to the present invention, utilizing plastic allows for the corresponding fluid filter design to reduce the number of component parts by eliminating the need for a sealing gasket. Although a gasket would normally be required at this particular sealing interface, the disclosed improvement creates a generally cylindrical surface to cylindrical surface contact between the nutplate sleeve and the endplate sleeve and, with the assistance of an interference-fit, a fluid-tight seal is established. This generally cylindrical sealed interface could also be created by the use of a spin weld to ensure that a permanent mechanical seal is made between the two parts. Other joining methods that could be used while still eliminating the need for a gasket is to place adhesive between the surfaces or use a threaded fit between the endplate and nutplate as detailed in FIG. 15.

Figure 15:
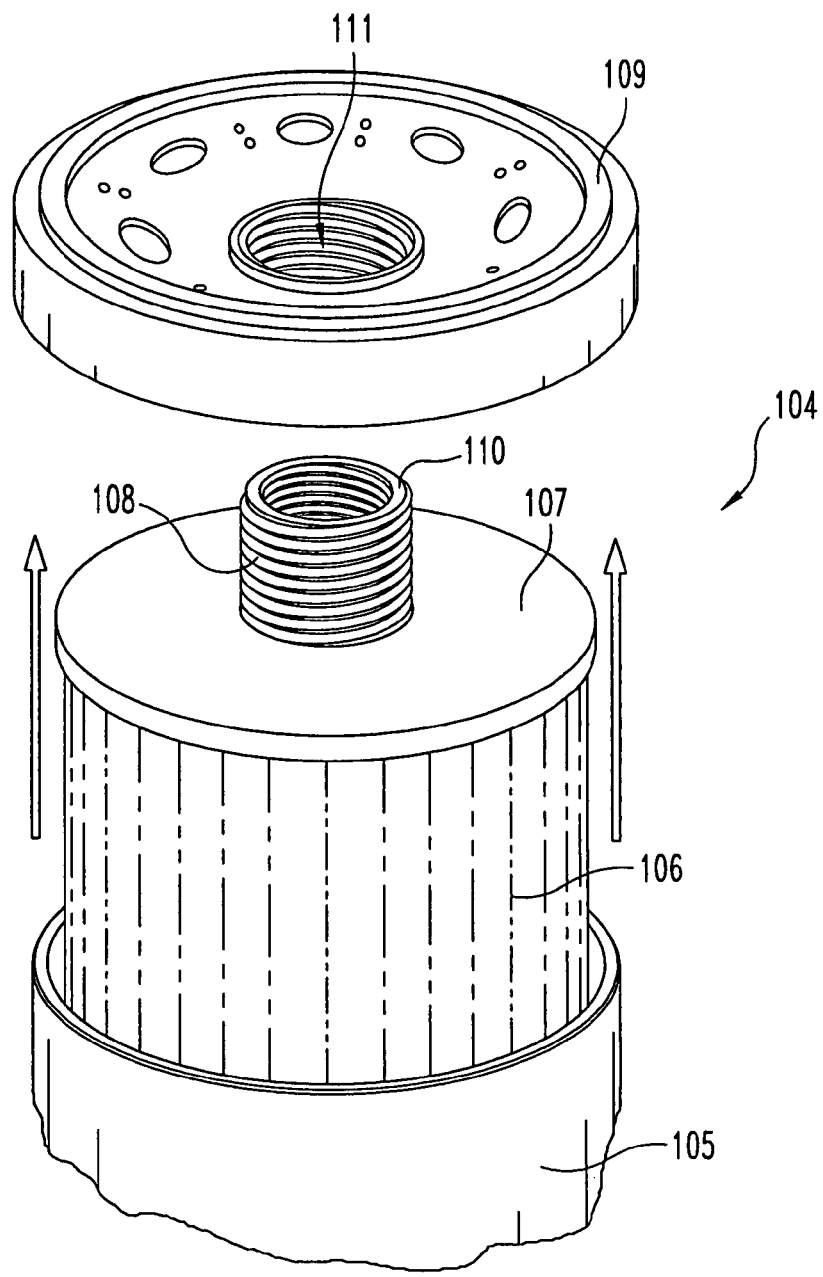
FIG. 15 is an exploded view of a fluid filter and nutplate combination providing another improvement feature according to the present invention.

Referring to FIG. 15, the referenced fluid filter improvement, according to the present invention, is illustrated. The illustrated fluid filter 104 (exploded view) includes a canister 105, filtering media 106, endplate 107, centertube 108, and nutplate 109. While the design of centertube 108 relative to endplate 107 and filtering media 106 may vary and while the specifics of the construction and assembly of these parts may vary, the focus of this improvement is on the form of end 110 of centertube 108.

End 110 extends beyond the outer surface of nutplate 109 and is externally-threaded for threaded engagement into the threaded bore 111 of nutplate 109. This secures the filtering media to the nutplate. Additionally, the centertube end 110 is internally-threaded for threaded engagement with a mounting head (not illustrated). While various head designs are possible, it is important that the axial height of the cooperating portions of the fluid filter 104 be compatible with the head design so as to achieve secure and tight threaded engagement while, at the same time, sealing the interface between the canister 105 and the mounting head.

Referring to FIGS. 16-19, additional fluid filter improvements, according to the present invention, are illustrated. Disclosed in FIGS. 16 and 17 is a fluid filter 114 that includes a canister 115, filtering media 116, extended height, plastic nutplate 117, and plastic endplate 118. The closed base 119 of canister 115 includes a shortened standpipe 120 for locating the endplate 118. The focus of this embodiment is directed to the concept of "embedding" the ends of the filtering media, shown as a pleated, generally cylindrical element. By heating the inwardly directed face of the nutplate, the exposed surface of plastic begins to soften. Once the plastic is sufficiently soft to receive the upper end 121 of the filtering media 116, this upper end 121 is forced into the softened plastic of the nutplate. Maintaining this assembly while the plastic cools, the plastic becomes hard and, in the process, the filtering media is securely joined to the nutplate as an integral combination. Additionally, the open end of the filtering media is sealed closed by the plastic of the nutplate. This fabrication method precludes the need for a separate top endplate and it precludes the need for any potting compound or adhesive. This same "embedding" is used for the opposite end 122 of filtering media 116. End 122 is embedded into plastic endplate 118.

Additional design features associated with fluid filter 114 include the co-molding of inner gasket 126 and the co-molding of outer gasket 127. Further, the inlet flow openings 128 are relocated toward the outer edge of nutplate 117 so that there is a sufficient flat area for the filtering media to embed into, as described. With regard to FIG. 17, it will be noted that the canister includes a spaced-apart series of molded finger indentations 129 for easier installation and removal.

Referring now to FIGS. 18 and 19, a slightly different fluid filter 132 is illustrated. The focus of this improvement is still on the fabrication concept and method of embedding the filtering media 133 into a plastic component. In the design of fluid filter 132, the nutplate is eliminated and a top plastic endplate 134 is used. The threads 135 for attachment to a mounting head are part of the centertube 136. In this design, using a plastic canister 137, the lower end 138 of the filtering media 133 is embedded into the lower surface 139 of canister 137. The opposite end 140 of the filtering media is embedded into endplate 134. Canister 137 includes axial gripping ribs 141 to aid in installation and removal of fluid filter 132.

Figure 20:
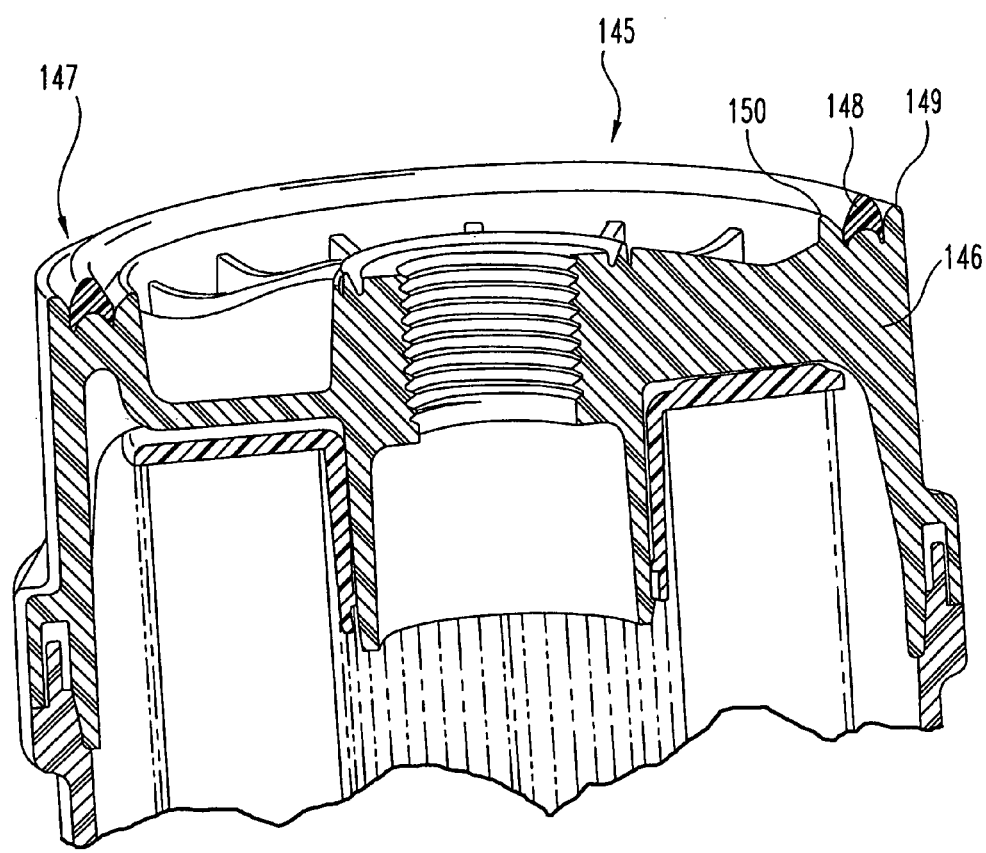
FIG. 20 is a partial, front elevational view, in full section, illustrating an improved nutplate edge geometry and seal assembly according to the present invention.

Referring now to FIG. 20, another improvement for a fluid filter, according to the present invention, is illustrated. Fluid filter 145 includes a nutplate 146 that can be constructed and arranged similar to nutplate 22 and for this discussion of the improvement feature, nutplate 22 has been used as the basis for nutplate 146. It will be noted that the improvement feature to be described relative to FIG. 20 is included as part of nutplate 22 as illustrated in FIG. 4.

With continued reference to FIG. 20, annular nutplate 146 is a unitary, molded plastic component that includes an annular, upper peripheral edge 147 that is constructed and arranged to receive an annular gasket 148. Edge 147 is configured with an outer, raised annular ridge 149 and spaced radially inwardly from outer ridge 149 is an inner, raised annular ridge 150. Gasket 148 is positioned between ridge 149 and ridge 150 and may be co-molded as part of nutplate 146. As fluid filter 145 is attached to a mounting head (not illustrated), the gasket 148 compresses against the head surface in order to establish a liquid-tight seal between fluid filter 145 and the mounting head, across gasket 148.

In order to provide a mechanical stop before gasket 148 is over compressed, ridge 149 extends upwardly away from the fluid filter 145 so as to contact the mounting head before ridge 150 and before gasket 148 is over compressed such that is becomes too rigid to retain the necessary resiliency for an effective seal. The use of ridge 149 as an abutment or mechanical stop limits the travel of fluid filter 145 and provides, at the same time, a visual indication of when the fluid filter 145 is properly seated and tightened onto the mounting head.

Figure 21:
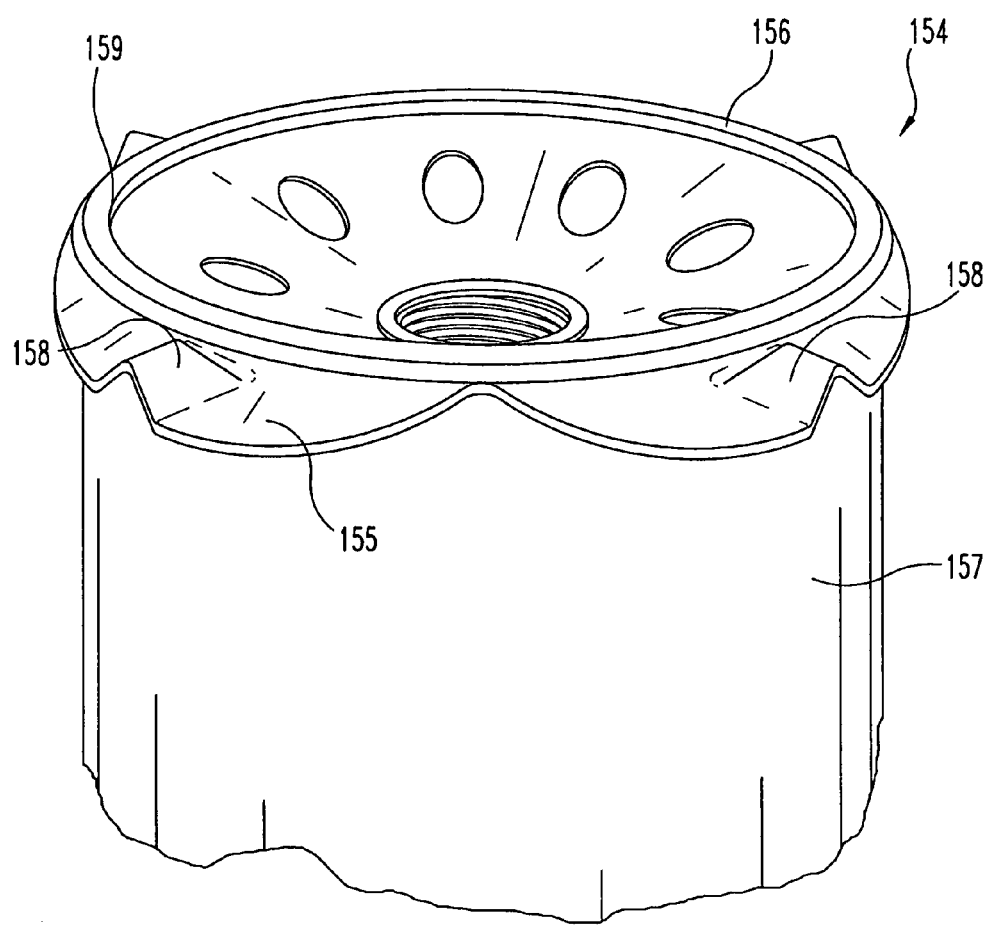
FIG. 21 is a partial, front elevational view of a fluid filter improvement according to the present invention.

Referring now to FIG. 21, another improvement for a fluid filter, according to the present invention, is illustrated. The improvement of FIG. 21 includes for fluid filter 154 the use of a plastic lip 155 (or sleeve or collar) that is joined to or around the open end 156 of canister 157 (or nutplate), depending on the specifics of the fluid filter 154 design. The interior of fluid filter 154 includes a mounting provision of some type for connecting the fluid filter 154 to a mounting head (not illustrated). The mounting head is constructed and arranged with a raised abutment tab to engage the tooth projection 158 molded as part of the unitary plastic lip 155. Two projections 158 are illustrated in FIG. 21 and can be used or only one projection can be used and the improvement is still provided. By proper positioning and construction of tooth projection 158, including its axial height and location relative to outer gasket 159, and by properly setting the location and axial height of the mounting head tab, the following sequence of events will occur.

As the fluid filter 154 is threaded onto the mounting head, the gasket 159 is gradually drawn into sealing contact against the mounting head. While it is important to securely tighten the fluid filter onto the head, the gasket 159 must not be over compressed such that it looses its resiliency and thus its sealing effectiveness. Just as the fluid filter 154 approaches its desired tightening torque relative to the mounting head, and just as the gasket 159 approaches its desired compression level, the tooth projection 158 is positioned adjacent the abutment tab. Additional tightening advancement of the fluid filter 154 onto the head causes the tooth projection 158 to engage the tab and the tab causes the tooth projection to deflect toward the closed end of the canister. In effect, the tooth projection rides up and over the tab due to the deflection of lip 155 and once the tab is cleared, there is an audible "click". This "click" signifies the point of proper installation for the fluid filter 154 relative to the mounting head. When two projections 158 are used, the first click is used as a first alert to signify that the designed tightening torque has almost been achieved. The second click indicates that the fluid filter is properly mounted.

Figure 22:
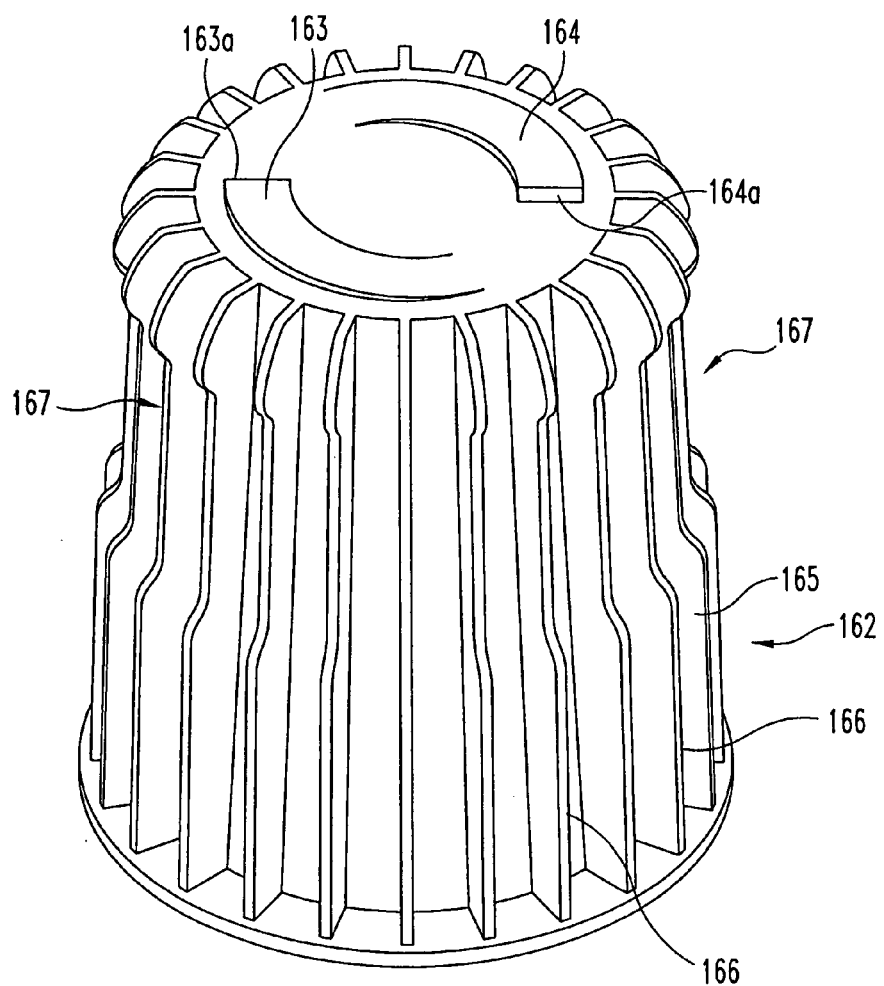
FIG. 22 is a partial, perspective view of a fluid filter canister providing a further fluid filter improvement according to the present invention.
Figure 23:
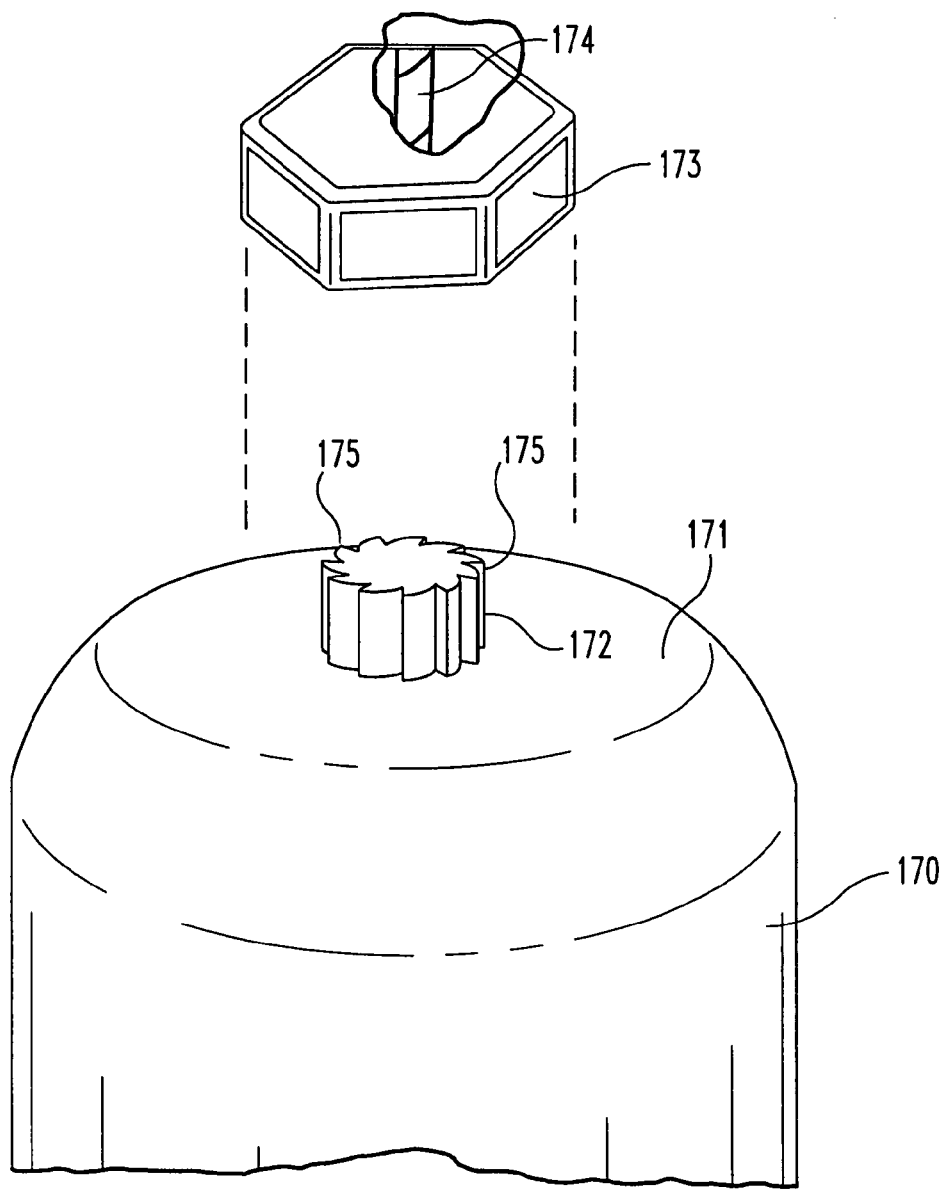
FIG. 23 is a partial, perspective view of a fluid filter canister providing a further fluid filter improvement according to the present invention.

With reference now to FIGS. 22 and 23, other improvements for a fluid filter, in accordance with the present invention, are illustrated. Referring first to FIG. 22, a canister 162 for a fluid filter is illustrated and is constructed and arranged with a pair of ramp projections 163 and 164 for enabling fluid filter removal by the use of a flat-bladed instruction, such as a screwdriver. The ramp directions and the raised end surfaces 163a and 164a, based on the thread engagement direction of the fluid filter onto the mounting head, dictate that these projections 163 and 164 are only usable for removal of the fluid filter from the head.

With continued reference to FIG. 22, it will be seen that the outer surface 165 of canister 162 includes a spaced-apart series of ribs 166 that are provided for enabling a better (manual) grip of the canister for installation onto and removal from the mounting head. Additionally, each rib 166 includes a registration detent 167 for receiving the clamping fingers of a filter wrench. These detents 167 facilitate easier installation and removal procedures when using a filter wrench.

Referring now to the exploded view of FIG. 23, a canister 170 of a fluid filter is illustrated as including a closed base 171 that is constructed and arranged with a toothed post 172. Each tooth 175 has a slight curvature so as to be able to function as a ratchet. Whenever it is desired to be able to limit the removal options for the fluid filter and preclude easy fluid filter removal by an unauthorized party, toothed post 172 can be used.

In order to remove the fluid filter by using the toothed post 172, a unique one-way ratcheting hex nut 173 must be used. This nut 173 includes on its interior a pair of opposed tabs 174 (one is illustrated and the other is approximately 180 degrees apart). Each tab 174 has a slight angle or taper (not perpendicular) relative to the corresponding flat side of the hex nut. In this manner, each tab is constructed and arranged to function in a ratcheting mode (one directional) on post 172. The geometries of the teeth 175 on post 172 and the two tabs 174 mean that the nut 173 is a one-way nut and only allows the user to remove the fuel filter when using this feature.

Figure 24:
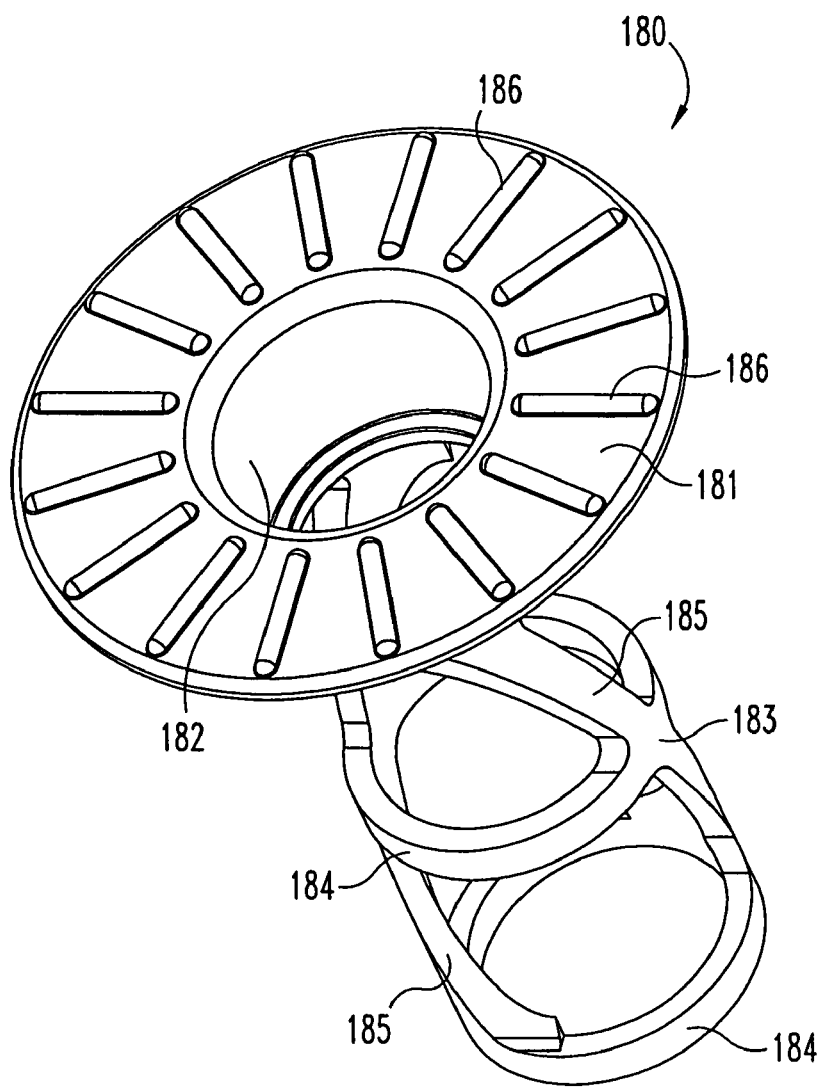
FIG. 24 is a perspective view of a fluid filter endplate according to another embodiment of the present invention.
Figure 25:
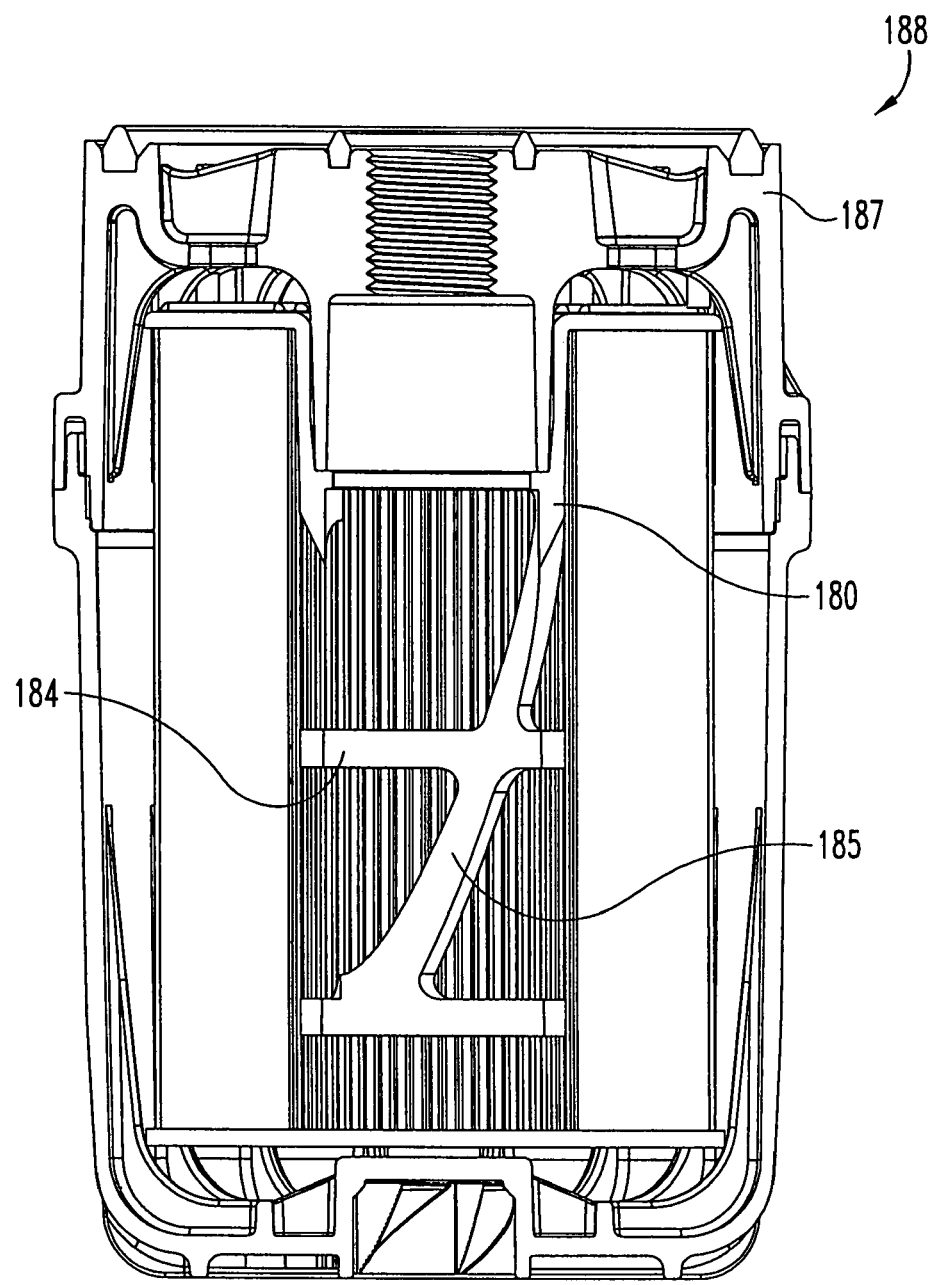
FIG. 25 is a front elevational view, in full section, of a fluid filter incorporating the FIG. 24 endplate.

Referring now to FIGS. 24 and 25, an alternative endplate 180 is illustrated. Endplate 180 includes an upper radial flange 181, a coaxial sleeve 182, and a centertube 183. While these three portions comprising endplate 180 are preferably molded out of plastic as a unitary component, endplate 180 can be fabricated from a plurality of discrete component parts that are integrally joined together to create the FIG. 24 embodiment.

The various fluid filter improvements and enhancements disclosed and described in FIGS. 1-23 have not focused specifically on the design and construction of the filtering media. Nevertheless, it should be understood that a suitable filtering media for purposes of the present invention can assume a variety of configurations and can be fabricated using any one of a number of suitable materials. One of the structural realities of a generally cylindrical filtering media, as illustrated in FIG. 25, is the desire to support the interior of the filtering media to prevent collapse due to a high pressure differential. This risk becomes greater as the filtering media begins to clog and the pressure differential becomes even greater. In order to address this particular issue, fluid filter designs of the type generally disclosed herein include a centertube that extends at least part way into the hollow interior of the filtering media. The centertube is designed to provide the desired support while also providing an exiting flow path for the fluid after it passes through the filtering media.

In the present invention, referring specifically to FIGS. 24 and 25, the design of endplate 180 integrates a centertube 183 into the unitary construction, such that it is coaxial with sleeve 182, as illustrated in FIG. 25. Centertube 183 includes two annular ring portions 184 and a plurality of connecting links 185 that have a spiral or helical geometry. The defined interior of centertube 183 is open as are the sides so as to enable the free flow of fluid to the outlet by way of nutplate sleeve 76 (or 76a-76d) and the threaded bore. Other structural configurations for the centertube portion of endplate 180 are acceptable so long as they have a generally cylindrical shape and sufficient flow area in order to handle the volume of fluid.

Figure 26:
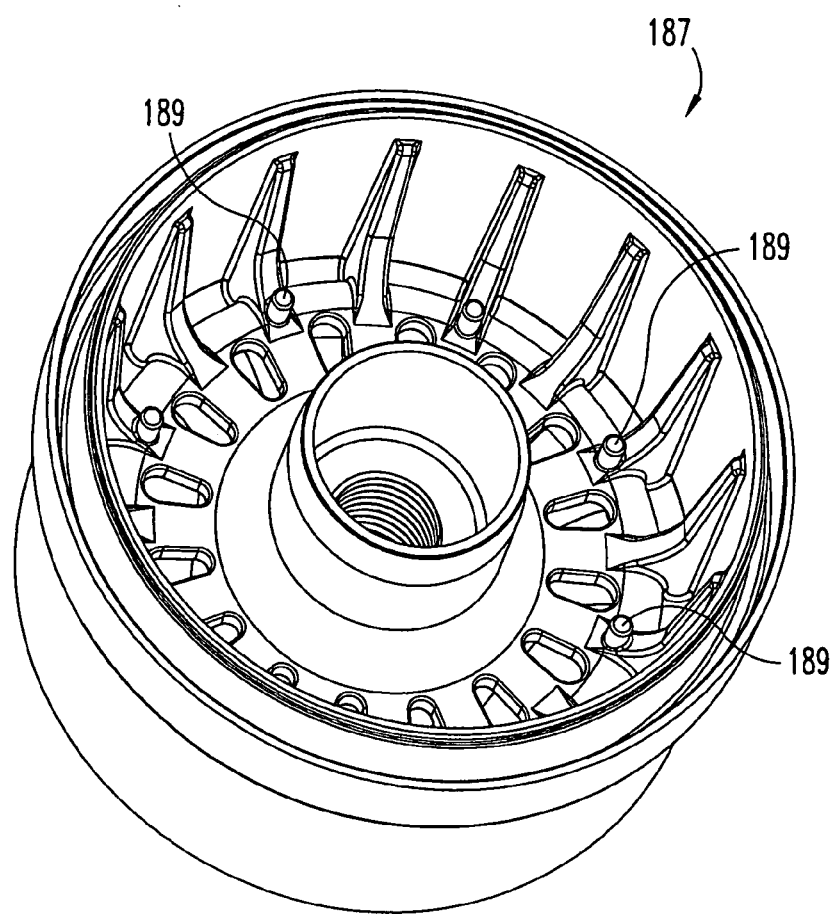
FIG. 26 is a perspective view of an alternate nutplate according to another embodiment of the present invention.

In the FIG. 24 illustration, the upper radial flange 181 includes a series of outwardly radiating ribs 186 that are similar in number, size and spacing to ribs 71 of endplate 70. The only difference in form or function between endplate 70 and endplate 180 is that endplate 180 does not include any standoffs that are comparable to standoffs 72 and endplate 180 includes the centertube 183. With regard to the elimination of any standoffs from the upper radial flange 181, it will be noted that FIG. 25 includes a modified nutplate 187 (see FIG. 26) and it is nutplate 187 that includes the standoffs. Referring to FIGS. 25 and 26, it will be seen that the fluid filter assembly 188 includes the FIG. 26 nutplate design wherein nutplate 187 is virtually identical to nutplate 22 or to nutplate 75 or to a nutplate with any of the sleeve styles of FIGS. 13A-13D, with the exception of standoffs 189. In reviewing FIG. 25, it will be noted that the standoffs that were part of the endplate, such as standoffs 72, are now a unitary part of the modified nutplate 187, and illustrated as standoffs 189. The spacing function of standoffs 72 is performed by standoffs 189 in the FIG. 25 fluid filter construction.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid filter constructed and arranged for mounting to a fluid-directing head, said fluid filter comprising:

a housing having a closed base and a sidewall defining a hollow cavity;

a filtering media defining an open interior and being positioned in the hollow cavity;

a nutplate joined to the housing and being constructed and arranged to enclose the filtering media, the nutplate defining a plurality of inlet flow openings and further defining a sleeve extending into the open interior, the sleeve providing an exit flow conduit;

an endplate joined to the filtering media and including a flange portion and a sleeve portion; and an elastomeric, flow-control valve having a first portion positioned between the flange portion of said endplate and the plurality of inlet flow openings and a second portion positioned between the sleeve portion of the endplate and the nutplate sleeve, wherein the first portion provides an anti-drain back capability and the second portion in cooperation with the nutplate sleeve provides a filtering media by-pass capability.

2. The fluid filter of claim 1 wherein the closed base of the housing is constructed and arranged with a one-way abutment ramp for cooperating with a bladed tool for facilitating the removal of the fluid filter from the fluid-directing head in only one direction.

3. The fluid filter of claim 1 wherein the housing is constructed and arranged with a plurality of gripping ribs for facilitating the removal of the fluid filter from the fluid-directing head.

4. The fluid filter of claim 1 wherein the housing is constructed and arranged with an annular recessed portion for cooperating with a filter removal wrench for facilitating the removal of the fluid filter from the fluid-directing head.

5. The fluid filter of claim 1 wherein the closed base of the housing is constructed and arranged with a ratchet-tooth post for cooperating with a ratchet nut for facilitating the removal of the fluid filter from the fluid-directing head.

6. The fluid filter of claim 1 wherein each inlet flow opening has a tear drop-shaped peripheral edge.

7. The fluid filter of claim 1 wherein the fluid filter includes a face seal and the nutplate includes an upper peripheral edge that is constructed and arranged with an inner annular ridge and an outer annular ridge, wherein the face seal is positioned between the inner and outer annular ridges and wherein the outer annular ridge is axially higher than the inner annular ridge for functioning as an abutment stop against the fluid-directing head.

8. The fluid filter of claim 1 wherein the flange portion of the endplate includes a plurality of flow ribs.

9. The fluid filter of claim 8 wherein the flange portion of the endplate includes a plurality of standoffs.

10. The fluid filter of claim 1 wherein the nutplate sleeve is a lobed sleeve.

11. The fluid filter of claim 1, wherein the nutplate includes an annular crush rib that is constructed and arranged for establishing a sealed interface against the fluid-directing head.

12. The fluid filter of claim 11, wherein the closed base of the housing is constructed and arranged with an abutment ramp for cooperating with a bladed tool for facilitating the removal of the fluid filter from the fluid-directing head.

13. The fluid filter of claim 11, wherein the housing is constructed and arranged with a plurality of gripping ribs for facilitating the removal of the fluid filter from the fluid-directing head.

14. The fluid filter of claim 13, wherein the housing is constructed and arranged with an annular recessed portion for cooperating with a filter removal wrench for facilitating the removal of the fluid filter from the fluid-directing head.

15. The fluid filter of claim 14, wherein the closed base of the housing is constructed and arranged with a ratchet-tooth post for cooperating with a ratchet nut for facilitating the removal of the fluid filter from the fluid-directing head.

16. The fluid filter of claim 11, wherein each inlet flow opening has a tear drop-shaped peripheral edge.

17. The fluid filter of claim 11, wherein the filtering media is imbedded into the flange portion of the endplate for establishing a sealed interface therebetween.

18. The fluid filter of claim 17, wherein the endplate sleeve portion is constructed and arranged with a size and shape that creates an interference fit around the nutplate sleeve for establishing a sealed interface therebetween.

19. The fluid filter of claim 18, wherein the closed base of the housing is constructed and arranged with an abutment ramp for cooperating with a bladed tool for facilitating the removal of the fluid filter from the fluid-directing head.

20. The fluid filter of claim 19, wherein the housing is constructed and arranged with a plurality of gripping ribs for facilitating the removal of the fluid filter from the fluid-directing head.

21. The fluid filter of claim 20, wherein the housing is constructed and arranged with an annular recessed portion for cooperating with a filter removal wrench for facilitating the removal of the fluid filter from the fluid-directing head.

22. The fluid filer of claim 21, wherein the closed base of the housing is constructed and arranged with a ratchet-tooth post for cooperating with a ratchet nut for facilitating the removal of the fluid filter from the fluid-directing head.

23. The fluid filter of claim 22, wherein each inlet flow opening has a tear drop-shaped peripheral edge.

\* \* \* \* \*